US009300818B2

(12) United States Patent
Matsui et al.

(10) Patent No.: US 9,300,818 B2
(45) Date of Patent: Mar. 29, 2016

(54) INFORMATION PROCESSING APPARATUS AND METHOD

(71) Applicant: FUJITSU LIMITED, Kawasaki-shi (JP)

(72) Inventors: Kazuki Matsui, Kawasaki (JP); Kenichi Horio, Kawasaki (JP); Ryo Miyamoto, Kawasaki (JP); Tomoharu Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 414 days.

(21) Appl. No.: 13/708,450

(22) Filed: Dec. 7, 2012

(65) Prior Publication Data

US 2013/0156269 A1 Jun. 20, 2013

(30) Foreign Application Priority Data

Dec. 20, 2011 (JP) ................................. 2011-278937

(51) Int. Cl.
| G06K 9/00 | (2006.01) |
| H04N 1/00 | (2006.01) |
| H04L 29/08 | (2006.01) |

(52) U.S. Cl.
CPC ............ *H04N 1/00209* (2013.01); *H04L 67/04* (2013.01); *H04L 67/08* (2013.01); *H04L 67/2828* (2013.01); *H04L 67/2895* (2013.01)

(58) Field of Classification Search
None
See application file for complete search history.

(56) References Cited

U.S. PATENT DOCUMENTS

| 6,215,898 | B1 * | 4/2001 | Woodfill et al. | ............... 382/154 |
| 2006/0285758 | A1 * | 12/2006 | Marugame | ..................... 382/236 |
| 2009/0067677 | A1 * | 3/2009 | Nobori et al. | ................. 382/107 |
| 2011/0258339 | A1 * | 10/2011 | Matsui et al. | ................. 709/236 |

FOREIGN PATENT DOCUMENTS

| JP | 2007-265220 | 10/2007 |
| JP | 2010-282609 | 12/2010 |

OTHER PUBLICATIONS

JPOA—Office Action mailed on Jul. 7, 2015 issued with respect to the basic Japanese Patent Application No. 2011-278937, with partial English translation.

* cited by examiner

*Primary Examiner* — Weiwen Yang
(74) *Attorney, Agent, or Firm* — Fujitsu Patent Center

(57) ABSTRACT

An information processing apparatus includes an image generation unit that generates an image to be displayed at a terminal; a moved area detecting unit that detects a moved area in the image; a determining unit that determines whether the moved area includes a changed partial area that is different before and after the movement; an identifying unit that identifies the changed partial area as a frequently-changed area when the changed partial area is changed within a predetermined period of time for a number of times greater than or equal to a threshold; a first transmission unit that transmits image data of the changed partial area not identified as the frequently-changed area to the terminal; a second transmission unit that transmits video data of the frequently-changed area to the terminal; and a third transmission unit that transmits movement and size information of the moved area to the terminal.

4 Claims, 16 Drawing Sheets

FIG.3C
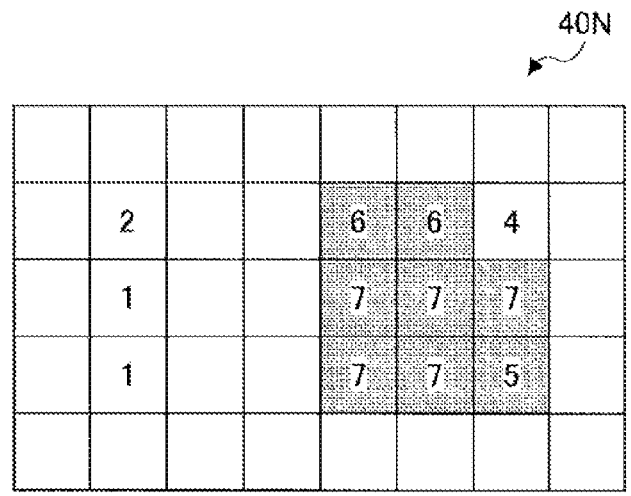
FIG.4
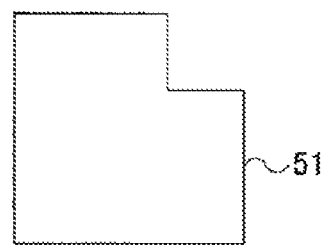
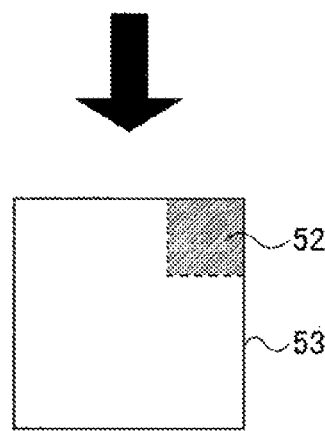

FIG.9
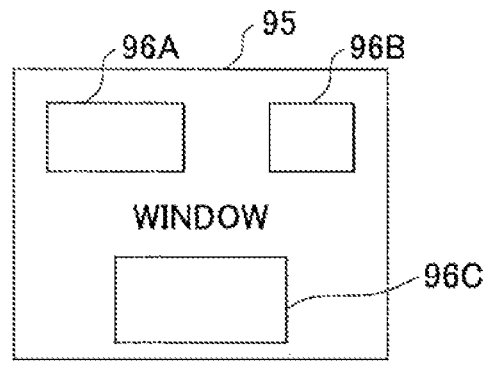
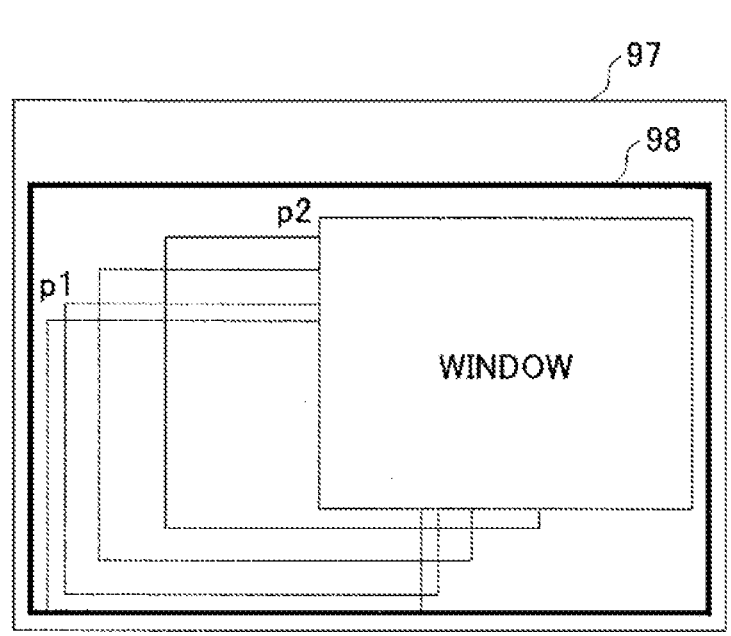

FIG.11
(1) WHEN NO MOVED AREA IS DETECTED BUT CHANGED AREA IS DETECTED
(2) WHEN MOVED AREA IS DETECTED AND NO CHANGED AREA IS DETECTED IN MOVED AREA
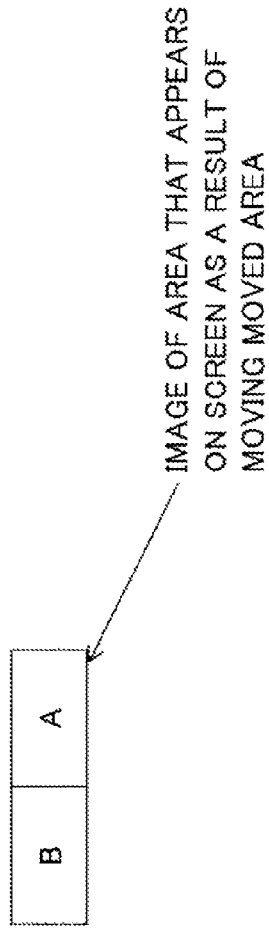
IMAGE OF AREA THAT APPEARS ON SCREEN AS A RESULT OF MOVING MOVED AREA
(3) WHEN MOVED AREA IS DETECTED AND CHANGED AREA IS DETECTED IN MOVED AREA

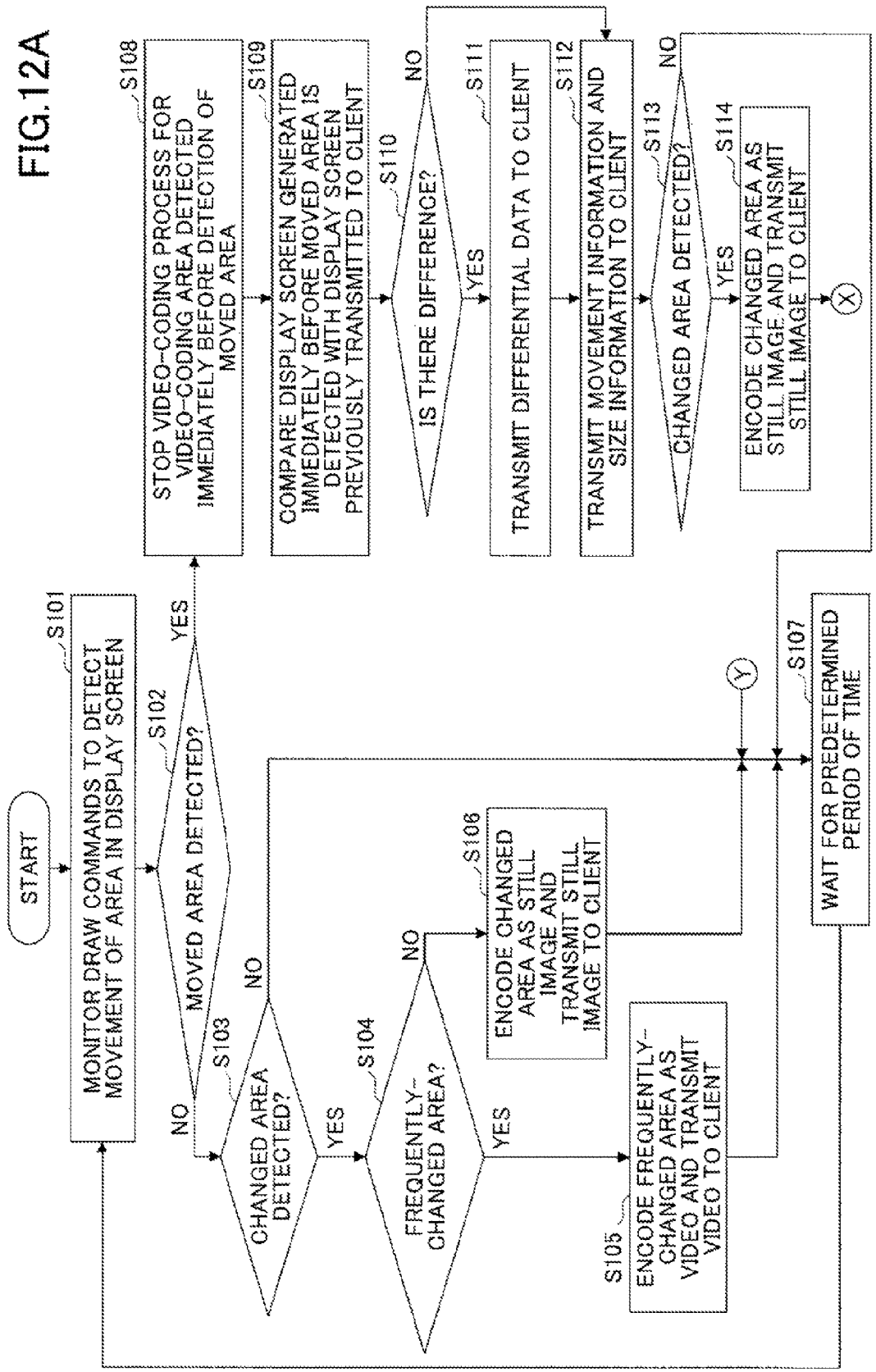

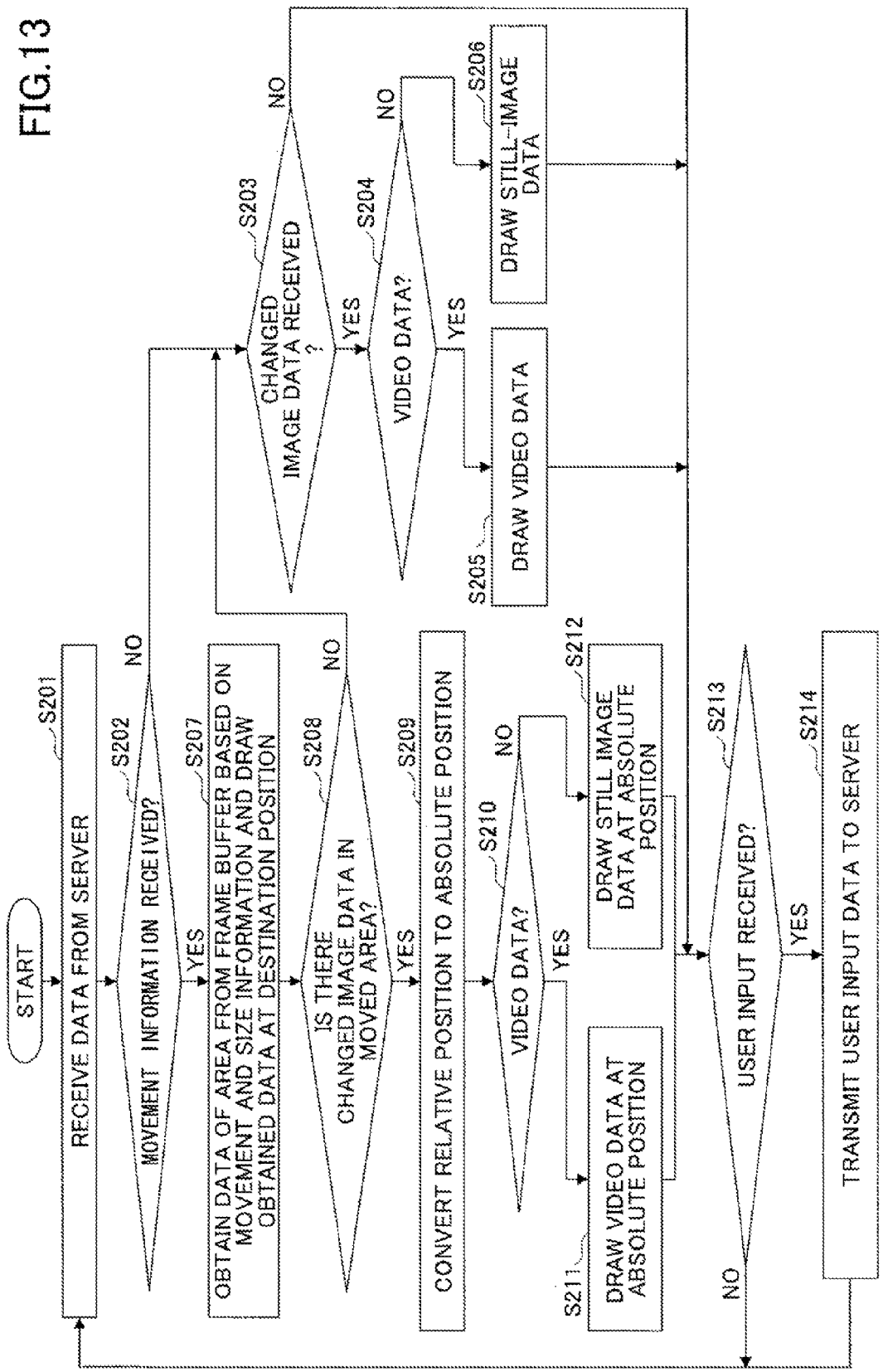

INFORMATION PROCESSING APPARATUS AND METHOD

CROSS-REFERENCE TO RELATED APPLICATION

This application is based upon and claims the benefit of priority of Japanese Patent Application No. 2011-278937 filed on Dec. 20, 2011, the entire contents of which are incorporated herein by reference.

FIELD

An aspect of this disclosure relates to an information processing apparatus, an information processing method, and a storage medium.

BACKGROUND

"Thin client" technologies are commonly used to prevent information leaks and to reduce operation and maintenance costs of personal computers (PCs). In a thin client system, clients have minimum functions and a server manages resources such as applications and files.

In such a thin client system, although the server actually executes processes and causes the clients to display the results of the processes and data stored in the server, it appears as if the clients themselves execute the processes and store the data.

For example, in a thin client system, a server executes business applications such as a word processor and a mailer, and causes clients to display the processing results of the business applications. Here, it is desired to use a wider range of applications in a thin client system in addition to business applications as described above. Examples of such applications include an application (e.g., a computer-aided design (CAD) application) for processing detailed images and an application for processing videos.

However, when large-volume data such as images and videos are transmitted via a protocol such as a Remote Desktop Protocol (RDP) or a Remote Frame Buffer (RFB) protocol for Virtual Network Computing (VNC) used for communications in a thin client system, the response time of operations performed at clients increases. This problem occurs not only in processes involving transmission of images and videos, but in any process involving transmission of high-volume data for screen updates between a client and a server in a thin client system.

Japanese Laid-Open Patent Publication No. 2010-282609 discloses a technology for reducing the amount of data transmitted. In the disclosed technology, either updated display data itself or data primitives that implement the updated display data are transmitted based on transmission efficiency.

Japanese Laid-Open Patent Publication No. 2007-265220 discloses a technology where identifiers and area information of images are transmitted to a display device when those images are stored in the display device.

SUMMARY

According to an aspect of this disclosure, there is provided an information processing apparatus connected via a network to a terminal. The information processing apparatus includes an image generation unit configured to generate an image to be displayed at the terminal; a moved area detecting unit configured to detect a moved area in the image; a determining unit configured to determine whether the detected moved area includes a changed partial area that is different before and after movement of the moved area; an identifying unit configured to identify the changed partial area as a frequently-changed area when the changed partial area is changed within a predetermined period of time for a number of times greater than or equal to a threshold; a first transmission unit configured to transmit image data of the changed partial area not identified as the frequently-changed area to the terminal; a second transmission unit configured to transmit video data of the changed partial area identified as the frequently-changed area to the terminal; and a third transmission unit configured to transmit movement information and size information of the moved area to the terminal.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 3C is a drawing used to describe an exemplary method of determining the change frequency of a display screen;

FIG. 4 is a drawing used to describe an exemplary method of correcting a mesh cell aggregate;

FIG. 9 is a drawing used to describe an exceptional process of a video-coding area determining process for a moved area;

FIG. 11 is a drawing illustrating order of data received at a client;

FIG. 12A is a flowchart illustrating an exemplary process performed by a server;

FIG. 13 is a flowchart illustrating an exemplary process performed by a client.

DESCRIPTION OF EMBODIMENTS

The related-art technologies described above are based on an assumption that information displayed in an area (e.g., a window) moved in a screen image is not updated. In this case, only movement information of the moved area is transmitted to the client and the moved area is displayed by copying (or moving) data of the moved area stored in a client-side frame buffer to reduce the amount of data transmitted to the client.

Here, when a moved area in a screen image includes, for example, a banner or animation advertisement that is updated, simply copying data of the area is not appropriate.

Accordingly, with the related-art technologies, when a moved area includes a partial area that is updated or changed, data of the moved area cannot be simply copied and therefore the amount of data transmitted to the client is not reduced.

An aspect of this disclosure provides an information processing apparatus, an information processing method, and a storage medium storing a program that make it possible to reduce the amount of data to be transmitted to a client in a thin client system.

Preferred embodiments of the present invention are described below with reference to the accompanying drawings.

<System>

Figure 1:
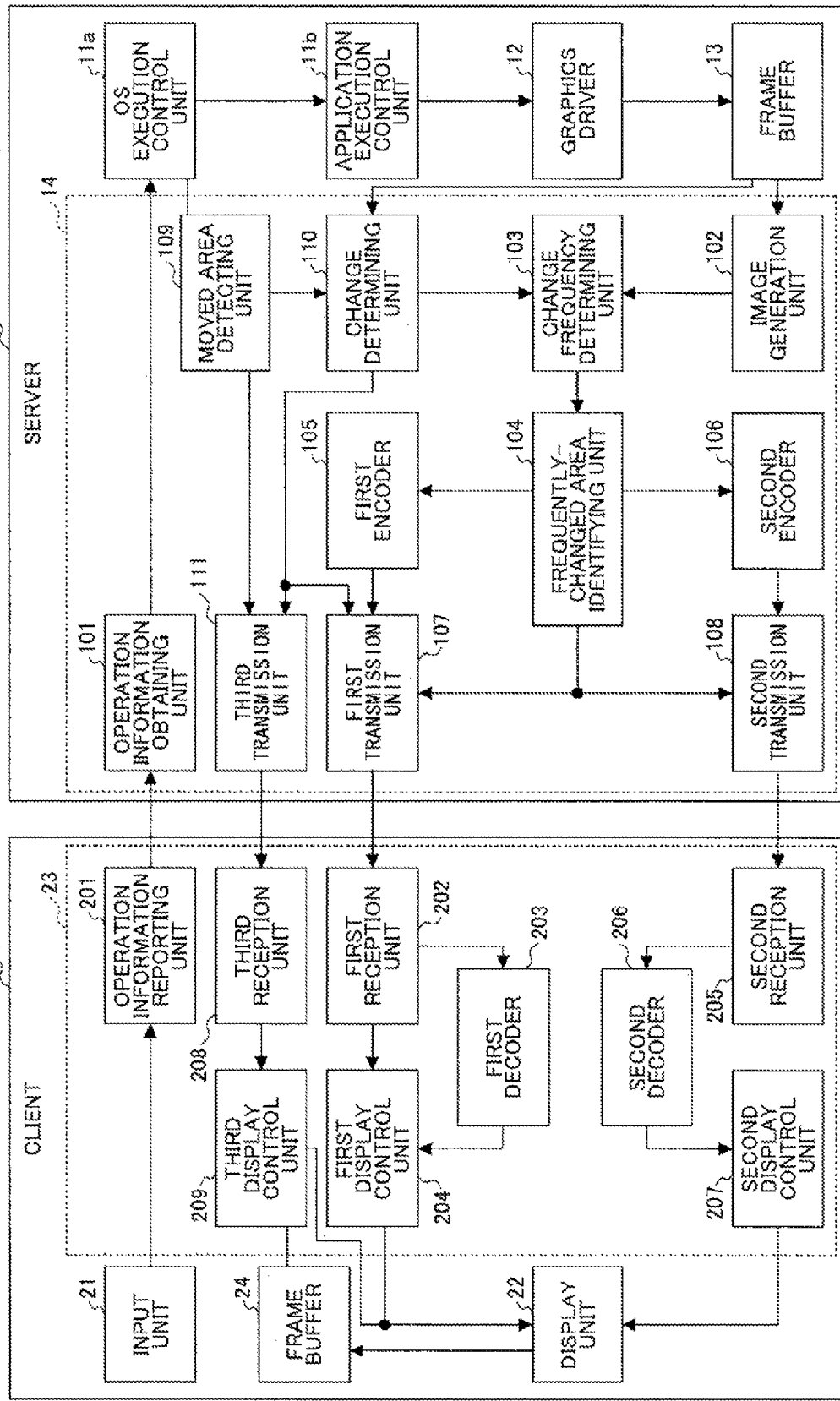
FIG. 1 is a block diagram illustrating exemplary configurations of a server and a client in a thin client system according to an embodiment.

A thin client system 1 according to the present embodiment is described below. FIG. 1 is a block diagram illustrating exemplary configurations of a server 10 and a client 20 in the thin client system 1.

In the thin client system 1, the server 10 remotely controls screens displayed by the client 20. The server 10 and the client 20 may be implemented, for example, by information processing apparatuses.

In the thin client system 1, although the server 10 actually executes processes and causes the client 20 to display the results of the processes and data stored in the server 10, it appears as if the client 20 itself executes the processes and stores the data.

In the example of FIG. 1, the thin client system 1 includes one server 10 and one client 20. However, two or more clients 20 may be connected to one server 10, and two or more servers 10 may be provided in the thin client system 1.

The server 10 and the client 20 are connected to each other via a network so as to be able to communicate with each other. The network may be implemented by any type of wired or wireless network such as the Internet, a local area network (LAN), or a virtual private network (VPN). In the present embodiment, it is assumed that the Remote Frame Buffer (RFB) protocol for Virtual Network Computing (VNC) is used for communications between the server 10 and the client 20.

The server 10 is a computer that provides a service for remotely controlling screens displayed by the client 20. A server application for remote screen control is installed or preinstalled in the server 10. Hereafter, the server application for remote screen control is referred to as a "server-side remote screen control application".

The server-side remote screen control application includes a function that provides a remote screen control service. For example, the server-side remote screen control application obtains operation information indicating an operation performed at the client 20 and causes the corresponding application running on the server 10 to perform a process requested by the operation.

The server-side remote screen control application generates an image of a screen for displaying the result of the process performed by the application and transmits the generated image to the client 20. More specifically, the server-side remote screen control application determines parts of the generated image that are different from a bitmap image previously displayed at the client 20, and transmits a rectangular update image formed by combining pixels of the determined parts to the client 20. In the present embodiment, it is assumed that an update image has a rectangular shape. However, this disclosure may also be applied to a case where an update image has a shape other than a rectangular shape.

The server-side remote screen control application may also include a function to compress data of a part of an image that greatly changes between frames according to a video compression format (algorithm or standard) and transmit the compressed data to the client 20. For example, the server-side remote screen control application divides an image of a screen generated based on a result of a process performed by an application into multiple areas and monitors the change frequency of each of the areas.

In this case, the server-side remote screen control application transmits, to the client 20, attribute information of a frequently-changed area whose change frequency exceeds a threshold. Also, the server-side remote screen control application encodes the bitmap images of the frequently-changed area according to an MPEG (Moving Picture Experts Group) format such as MPEG-2 or MPEG-4, and transmits the encoded data to the client 20.

The compression format used for this purpose is not limited to an MPEG format. For example, any other video compression format such as the Motion-JPEG (Joint Photographic Experts Group) format may be used.

The server-side remote screen control application may also include a function to stop a video-coding process when an area is moved in a screen and to transmit movement information and size information of the area to the client 20. Hereafter, an area moved in a screen may be referred to as a "moved area".

When there is a changed part (a part that is changed or to be changed, may also be referred to as a "changed area") in the moved area, the server-side remote screen control application transmits, to the client 20, one of video data obtained by encoding the changed part according to a video compression format and still image data that is either encoded data of still images of the changed part before and after the change or differential data of the still images.

The client 20 is a computer that receives the remote screen control service provided by the server 10. The client 20 may be implemented, for example, by a fixed terminal such as a personal computer (PC) or by a mobile terminal such as a mobile phone, a Personal Handy-phone System (PHS) phone, or a personal digital assistant (PDA).

A client application for remote screen control is installed or preinstalled in the client 20. Hereafter, the client application for remote screen control is referred to as a "client-side remote screen control application".

The client-side remote screen control application reports operation information indicating operations received via input devices such as a mouse and a keyboard to the server 10. For example, the client-side remote screen control application reports operation information indicating a right click, a left click, a double click, or dragging of the mouse, or the amount of movement of a mouse cursor obtained based on a moving operation of the mouse. As another example, the client-side remote screen control application may report operation information indicating the amount of rotation of a mouse wheel or the type of a key pressed on the keyboard.

The client-side remote screen control application includes a function for displaying an image received from the server 10 on a display unit. For example, when receiving a rectangular update image from the server 10, the client-side remote screen control application displays the rectangular update image at a position where a change from the previously displayed bitmap image is detected.

As another example, when receiving attribute information of a frequently-changed area from the server 10, the client-side remote screen control application sets an area on the display screen corresponding to a position in the attribute information as a blank area where no bitmap image is to be displayed. Then, when receiving data in a video compression format, the client-side remote screen control application decodes the data and displays the decoded data in the blank area.

Also, when receiving movement information and size information of a moved area from the server 10, the client-side remote screen control application copies the corresponding area of bitmap data in a frame buffer based on the size information and displays the copied area at a destination position based on the movement information.

Further, when there is a changed part in a moved area and data of the changed part is received from the server 10, the client-side remote screen control application displays a rectangular update image or a decoded video at a position corresponding to the changed part.

<Configuration of Server>

Next, an exemplary configuration of the server 10 of the present embodiment is described. As illustrated in FIG. 1, the server 10 may include an OS execution control unit 11a, an application execution control unit 11b, a graphics driver 12, a frame buffer 13, and a server-side remote screen control unit 14. The server 10 may also include other functional units such as input units (or devices) and display units (or devices) that a known computer normally includes.

The OS execution control unit 11a controls execution of an operating system (OS). The OS execution control unit 11a detects start instructions and commands for applications based on operation information obtained by an operation information obtaining unit 101 (described later). For example, when a double click on an icon of an application is detected, the OS execution control unit 11a requests the application execution control unit 11b to start the application.

As another example, when an operation to request execution of a command is detected on an operation screen or a window of a running application, the OS execution control unit 11a requests the application execution control unit 11b to execute the command.

The application execution control unit 11b controls execution of applications based on instructions or requests from the OS execution control unit 11a. For example, when requested by the OS execution control unit 11a to start an application or to execute a command of a running application, the application execution control unit 11b starts the application or executes the command.

The application execution control unit 11b requests the graphics driver 12 to draw a display image for displaying a result of executing an application in the frame buffer 13 (hereafter, this request may be referred to as a "drawing request"). When requesting the graphics driver 12 to draw a display image, the application execution control unit 11b inputs the display image and a drawing position of the display image to the graphic driver 12.

Applications to be executed by the application execution control unit 11b may be pre-installed in the server 10 or installed in the server after shipment. Also, applications such as JAVA (registered trademark) applications that run in a network environment may be executed by the application execution control unit 11b.

The graphics driver 12 draws images in the frame buffer 13. For example, when receiving a drawing request from the application execution control unit 11b, the graphics driver 12 draws, in a bitmap format, a display image for displaying a processing result of an application at a drawing position in the frame buffer 13 specified by the application.

In the above descriptions, the graphics driver 12 receives a drawing request from the application execution control unit 11b. However, the graphics driver 12 may also receive a drawing request from the OS execution control unit 11a. For example, when receiving a drawing request for drawing a mouse cursor from the OS execution control unit 11a, the graphics driver 12 draws, in a bitmap format, a display image for displaying the mouse cursor at a drawing position in the frame buffer 13 specified by the OS.

The frame buffer 13 is a storage device that stores bitmap data drawn by the graphics driver 12. The frame buffer 13 may be implemented, for example, by a semiconductor memory device such as a random access memory (RAM) (e.g., a video random access memory (VRAM)), a read-only memory (ROM), or a flash memory. Also, the frame buffer 13 may be implemented by a storage medium such as a hard disk or an optical disk.

The server-side remote screen control unit 14 provides a remote screen control service to the client 20 via the server-side remote screen control application. As illustrated in FIG. 1, the server-side remote screen control unit 14 may include an operation information obtaining unit 101, an image generation unit 102, a change frequency determining unit 103, a frequently-changed area identifying unit 104, a first encoder 105, a second encoder 106, a first transmission unit 107, a second transmission unit 108, a moved area detecting unit 109, a change determining unit 110, and a third transmission unit 111.

The operation information obtaining unit 101 obtains operation information from the client 20. For example, operation information may indicate a right click, a left click, a double click, or dragging of the mouse, or the amount of movement of a mouse cursor obtained based on a moving operation of the mouse. Also, operation information may indicate the amount of rotation of a mouse wheel or the type of a key pressed on the keyboard.

The image generation unit 102 generates an image of a screen to be displayed on a display unit 22 of the client 20. For example, each time when the graphics driver 12 stores bitmap data in the frame buffer 13, the image generation unit 102 performs a process as described below.

The image generation unit 102 compares a display screen image of the previous frame displayed by the client 20 and a display screen image written into the frame buffer 13 for the current frame. Then, the image generation unit 102 determines parts of the display screen image that have been changed from the previous frame, generates a rectangular update image by combining pixels of the determined parts and shaping the combined pixels into a rectangle, and generates a packet for transmitting the rectangular update image.

<Video-Coding Area Determining Process for Entire Screen>

A process for identifying a frequently-changed area in a screen independent of particular applications is described below. The frequently-changed area is to be encoded according to a video compression format. The frequently-changed area may also be referred to as a "video-coding area", and a process of encoding images according to a video compression format may be referred to as a "video-coding process". This process is performed when no moved area is detected.

The change frequency determining unit 103 determines the change frequency of each of areas of an image drawn in the frame buffer 13. For example, the change frequency determining unit 103 accumulates rectangular update images generated by the image generation unit 102 in an internal working memory (not shown) for a predetermined period of time.

More specifically, the change frequency determining unit 103 accumulates attribute information for identifying the positions and sizes of rectangular update images. For example, the attribute information of a rectangular update image may include the coordinates of the upper left vertex and the width and height of the rectangular update image. The period of time for accumulating rectangular update images affects the accuracy of identifying frequently-changed areas. As the period of time increases, the probability of false detection of frequently-changed areas decreases. In the present embodiment, it is assumed that rectangular update images are accumulated for one second.

When the predetermined period of time passes after starting accumulation of rectangular update images, the change frequency determining unit 103 determines the change frequency of a display screen to be displayed at the client 20 using a map obtained by dividing the display screen into a mesh.

Figure 2:
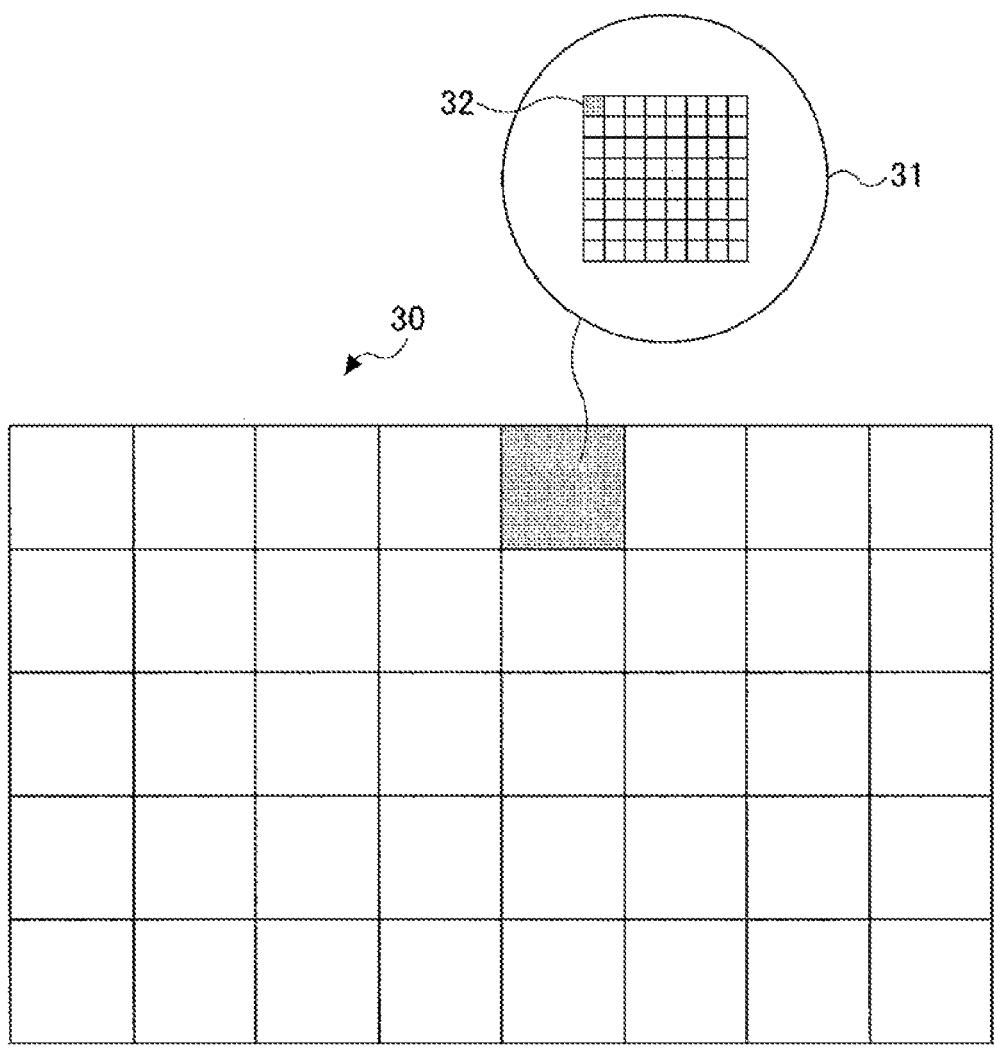
FIG. 2 is a drawing illustrating an example of a map.

FIG. 2 is a drawing illustrating an exemplary map 30 used to determine the change frequency of a display screen. The map 30 includes mesh cells 31. Each mesh cell 31 includes pixels 32. In the example of FIG. 2, it is assumed that the change frequency determining unit 103 divides the display screen into the mesh cells 31 each consisting of 8×8 pixels. Accordingly, each mesh cell 31 includes 64 pixels.

According to the positions and sizes of rectangular update images accumulated in the internal work memory, the change frequency determining unit 103 sequentially lays out the rectangular update images on the map 30. When laying out each rectangular update image on the map 30, the change frequency determining unit 103 increases the change count (which indicates the number of times a mesh cell has been changed) of each mesh cell 31 that overlaps the laid-out rectangular update image.

More specifically, when a rectangular update image laid-out on the map 30 overlaps a predetermined number of pixels or more of a mesh cell 31, the change frequency determining unit 103 increases the change count of the mesh cell 31 by one. Here, it is assumed that the change count of a mesh cell is increased when a laid-out rectangular update image overlaps one or more pixels of the mesh cell.

Figure 3A:
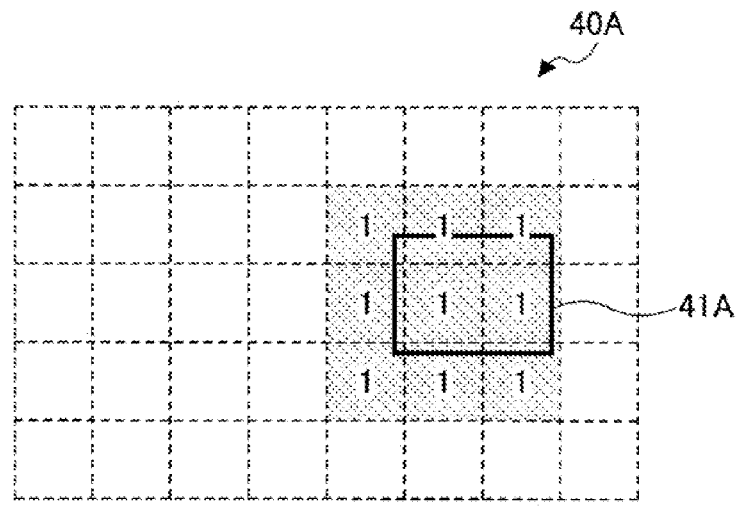
FIG. 3A is a drawing used to describe an exemplary method of determining the change frequency of a display screen.
Figure 3B:
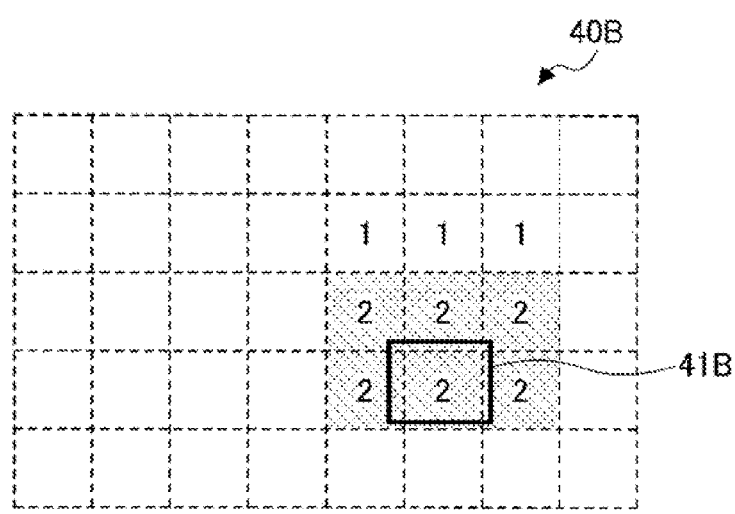
FIG. 3B is a drawing used to describe an exemplary method of determining the change frequency of a display screen.

FIGS. 3A through 3C are drawings used to describe an exemplary method of determining the change frequency of a display screen. FIGS. 3A, 3B, and 3C, respectively, illustrate maps 40A, 40B, and 40N used to determine the change frequency of a display screen. In FIGS. 3A and 3B, reference numbers 41A and 41B indicate rectangular update images. In FIG. 3A, numbers in the mesh cells of the map 40A indicate the change counts of the mesh cells at the time when the rectangular update image 41A is laid out.

In FIG. 3B, numbers in the mesh cells of the map 40B indicate the change counts of the mesh cells at the time when the rectangular update image 41B is laid out. In FIG. 3C, numbers in the mesh cells of the map 40N indicate the change counts of the mesh cells after all of the rectangular update images accumulated in the internal work memory are laid out. In FIGS. 3A through 3C, the change counts of mesh cells where no number is illustrated are assumed to be zero.

As illustrated in FIG. 3A, the rectangular update image 41A laid out on the map 40A overlaps shaded mesh cells. Therefore, the change frequency determining unit 103 increases the change counts of the shaded mesh cells by one. In this example, it is assumed that the current change counts of the mesh cells are zero, and therefore the change counts of the shaded mesh cells are increased to "1".

As illustrated in FIG. 3B, the rectangular update image 41B laid out on the map 40B overlaps shaded mesh cells. Therefore, the change frequency determining unit 103 increases the change counts of the shaded mesh cells by one. In this case, since the current change counts of the shaded mesh cells are "1", the change counts of the shaded mesh cells are increased to "2". Here, it is assumed that the change counts of the mesh cells become as illustrated in FIG. 3C after all of the accumulated rectangular update images are laid out on the map.

After laying out all of the rectangular update images accumulated in the internal work memory, the change frequency determining unit 103 identifies mesh cells whose change counts or change frequencies within the predetermined period of time are greater than a threshold. In the example of FIG. 3C, assuming that the threshold is "4", shaded meshes in the map 40N are identified.

Increasing the value of the threshold makes it possible to more accurately identify an area of the display screen where a video is to be displayed and to encode an image corresponding to the area by the second encoder 106. The threshold may be selected by the end user from a series of thresholds set by the developer of the server-side remote screen control application, or may be set freely by the end user.

Referring back to FIG. 1, the frequently-changed area identifying unit 104 identifies a frequently-changed area of the display screen to be displayed at the client 20.

When mesh cells whose change counts within the predetermined period of time are greater than a threshold are identified by the change frequency determining unit 103, the frequently-changed area identifying unit 104 combines adjacent mesh cells into a mesh cell aggregate and corrects the mesh cell aggregate into a rectangular shape. For example, the frequently-changed area identifying unit 104 obtains a supplemental area for supplementing the mesh cell aggregate and adds the supplemental area to the mesh cell aggregate to correct the mesh cell aggregate into a rectangular shape. The supplemental area may be obtained by using an algorithm that can generate a minimum area that is sufficient to shape a mesh cell aggregate into a rectangle.

FIG. 4 is a drawing used to describe an exemplary method of correcting a mesh cell aggregate. In FIG. 4, a reference number 51 indicates a mesh cell aggregate before correction, a reference number 52 indicates a supplemental area, and a reference number 53 indicates a rectangular image obtained by correcting the mesh cell aggregate 51. As illustrated in FIG. 4, the frequently-changed area identifying unit 104 adds the supplemental area 52 to the mesh cell aggregate 51 to obtain the rectangular image 53. At this stage, the rectangular image 53 has not been determined to be a frequently-changed area and is therefore referred to as a "frequently-changed area candidate".

When there are plural frequently-changed area candidates, the frequently-changed area identifying unit 104 combines frequently-changed area candidates that are apart from each other by a distance less than or equal to a predetermined value to form a rectangular image. Here, the distance indicates the shortest distance between frequently-changed area candidates.

For example, the frequently-changed area identifying unit 104 obtains a supplemental area for filling a gap between frequently-changed area candidates and combines the frequently-changed area candidates and the supplemental area to form a rectangular image. The supplemental area may be obtained by using an algorithm that can generate a minimum area that is sufficient to fill a gap between frequently-changed area candidates to form a rectangular image.

Figure 5:
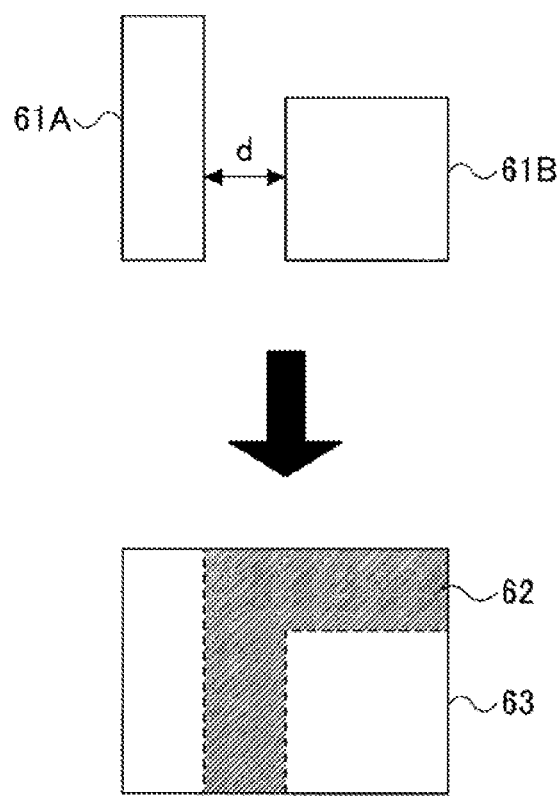
FIG. 5 is a drawing used to describe an exemplary method of combining frequently-changed area candidates.

FIG. 5 is a drawing used to describe an exemplary method of combining frequently-changed area candidates. In FIG. 5, reference numbers 61A and 61B indicate frequently-changed area candidates, a reference number 62 indicates a supplemental area, and a reference number 63 indicates a combined image obtained by combining the frequently-changed area candidates 61A and 61B and the supplemental area 62.

As illustrated in FIG. 5, the frequently-changed area identifying unit 104 combines the frequently-changed area candidates 61A and 61B and the supplemental area 62 to obtain the combined image 63. The frequently-changed area identifying unit 104 identifies the combined image 63 as a frequently-changed area.

When a frequently-changed area is identified as described above, the frequently-changed area identifying unit 104 outputs attribute information indicating the position and size of the frequently-changed area to the first transmission unit 107 and the second transmission unit 108.

The attribute information of the frequently-changed area is used to cause the client 20 to blank out a part of bitmap data of the display screen corresponding to the frequently-changed area. Then, the frequently-changed area identifying unit 104 clears the change counts of mesh cells mapped to an internal work memory. The frequently-changed area identifying unit 104 registers the attribute information of the frequently-changed area in the internal work memory.

Figure 6A:
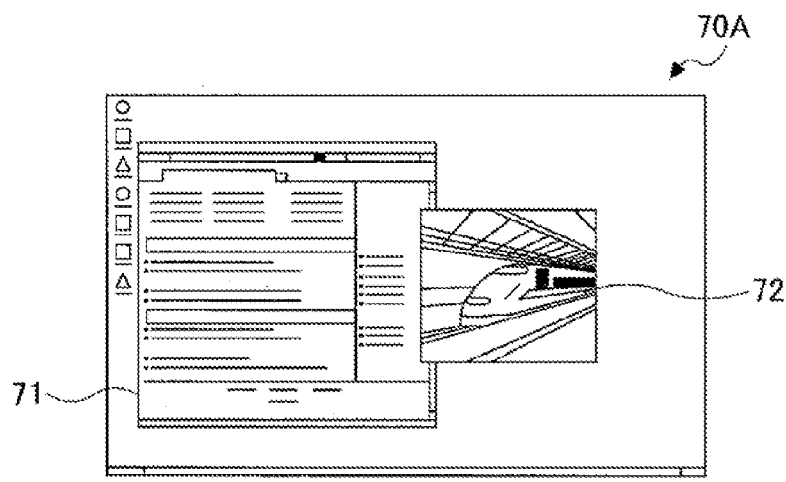
FIG. 6A is a drawing used to describe an exemplary method of reporting attribute information of a frequently-changed area.
Figure 6B:
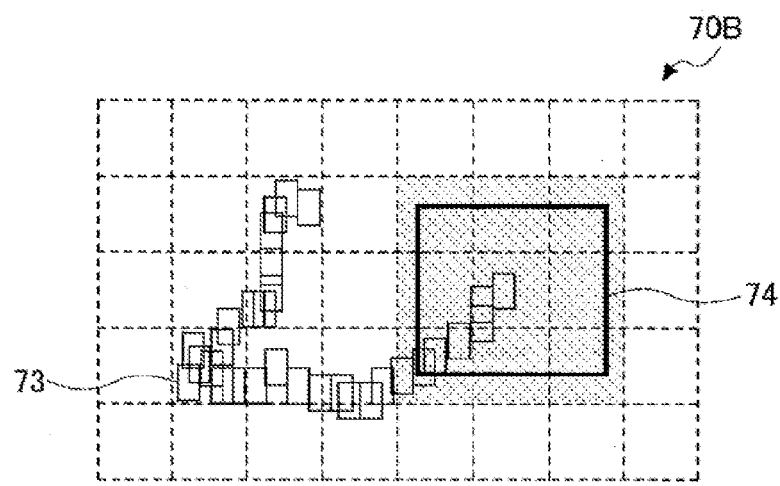
FIG. 6B is a drawing used to describe an exemplary method of reporting attribute information of a frequently-changed area.
Figure 6C:
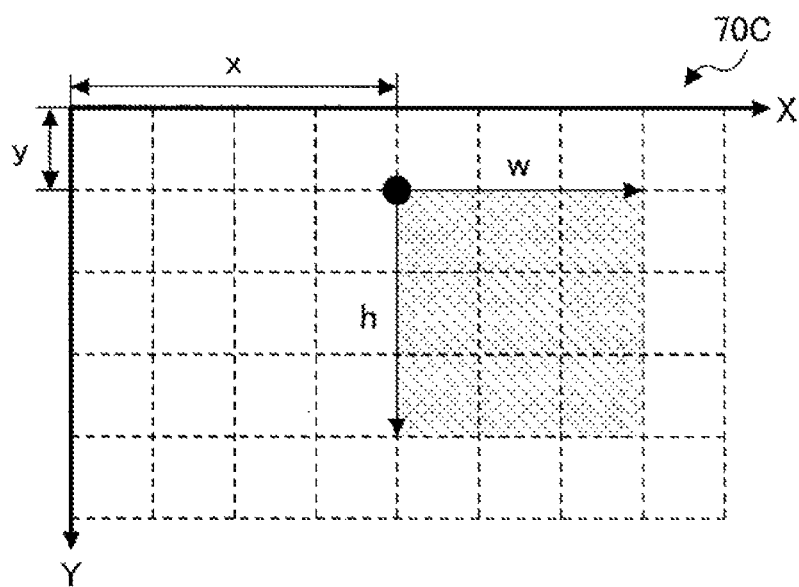
FIG. 6C is a drawing used to describe an exemplary method of reporting attribute information of a frequently-changed area.

FIGS. 6A through 6C are drawings used to describe an exemplary method of reporting attribute information of a frequently-changed area. In FIG. 6A, a reference number 70A indicates an exemplary display screen drawn in the frame buffer 13, a reference number 71 indicates a browser screen, and a reference number indicates a video playback screen. In FIG. 6B, a reference number 70B indicates a map used to determine the change frequency of the display screen 70A, a reference number 73 indicates a mouse trail (movement of a mouse), and a reference number 74 indicates a video playback area. In FIG. 6C, a reference number 70C indicates a map used to determine the change frequency of the display screen 70A.

As illustrated in FIG. 6A, the display screen 70A includes the browser screen 71 and the video playback screen 72. FIG. 6B indicates changes over time in the display screen 70A. In FIG. 6B, no rectangular update image is generated for the browser screen 71 that is a still image, but rectangular update images for the mouse trail 73 and the video playback area 74 are generated.

Here, it is assumed that the change counts of shaded mesh cells corresponding to the video playback area 74 are greater than a threshold and those shaded mesh cells have been identified by the frequently-changed area identifying unit 104 as a frequently-changed area. In this case, the frequently-changed area identifying unit 104 outputs attribute information including the coordinates (x, y) of the upper left vertex of the frequently-changed area (shaded area) and a width w and a height h of the frequently-changed area (see FIG. 6C) to the first transmission unit 107 and the second transmission unit 108.

Although the upper-left vertex is used in the above example to indicate the position of a frequently-changed area, any other vertex may be used for this purpose. Also, any point other than a vertex, e.g., a barycenter, may be used to indicate the position of a frequently-changed area. In the example of FIG. 6C, the origin of the X and Y coordinate axes is set at the upper left corner of the display screen. However, the origin of the X and Y coordinate axes may be set at any point inside or outside of the display screen.

Each time a rectangular update image is generated by the image generation unit 102, the frequently-changed area identifying unit 104 determines whether the rectangular update image is included in a frequently-changed area stored in the internal work memory, i.e., in a video area being transmitted by the second transmission unit 108.

When the rectangular update image is not included in the frequently-changed area, the frequently-changed area identifying unit 104 outputs the rectangular update image and attribute information including the position and size of the rectangular update image to the first encoder 105. Meanwhile, when the rectangular update image is included in the frequently-changed area, the frequently-changed area identifying unit 104 basically does not cause the rectangular update image to be transmitted from the first transmission unit 107. Exceptionally, when the rectangular update image included in the frequently-changed area corresponds to a mouse cursor drawn by the OS execution control unit 11a, the frequently-changed area identifying unit 104 may cause the rectangular update image and its attribute information to be transmitted from the first transmission unit 107.

Each time bitmap data is drawn in the frame buffer 13, the frequently-changed area identifying unit 104 determines whether attribute information of a frequently-changed area is registered in the internal work memory.

When attribute information of a frequently-changed area is registered in the internal work memory, the frequently-changed area identifying unit 104 cuts out a part of the bitmap data in the frame buffer 13 which corresponds to the frequently-changed area and outputs the cut-out part of the bitmap data to the second encoder 106.

With the above configuration, the server 10 transmits update images for areas other than frequently-changed areas and transmits data compressed according to a video compression format for frequently-changed areas. This configuration makes it possible to reduce the amount of data transmitted to the client 20 and thereby makes it possible to improve the responsiveness of a thin client system. Also, reducing the amount of data transmitted to the client 20 makes it possible to reduce transmission delays between the server 10 and the client 20, and thereby makes it possible to reduce the probability that image frames to be displayed at the client 20 are dropped.

<Video-Coding Area Determining Process for Moved Area>

An application-independent process for identifying a partial area in a moved area of a display screen as a frequently-changed area, which is to be encoded according to a video compression format, is described below. This process is performed when a moved area is detected. First, the reason for identifying a partial area that is changed in a moved area is described.

Figure 7:
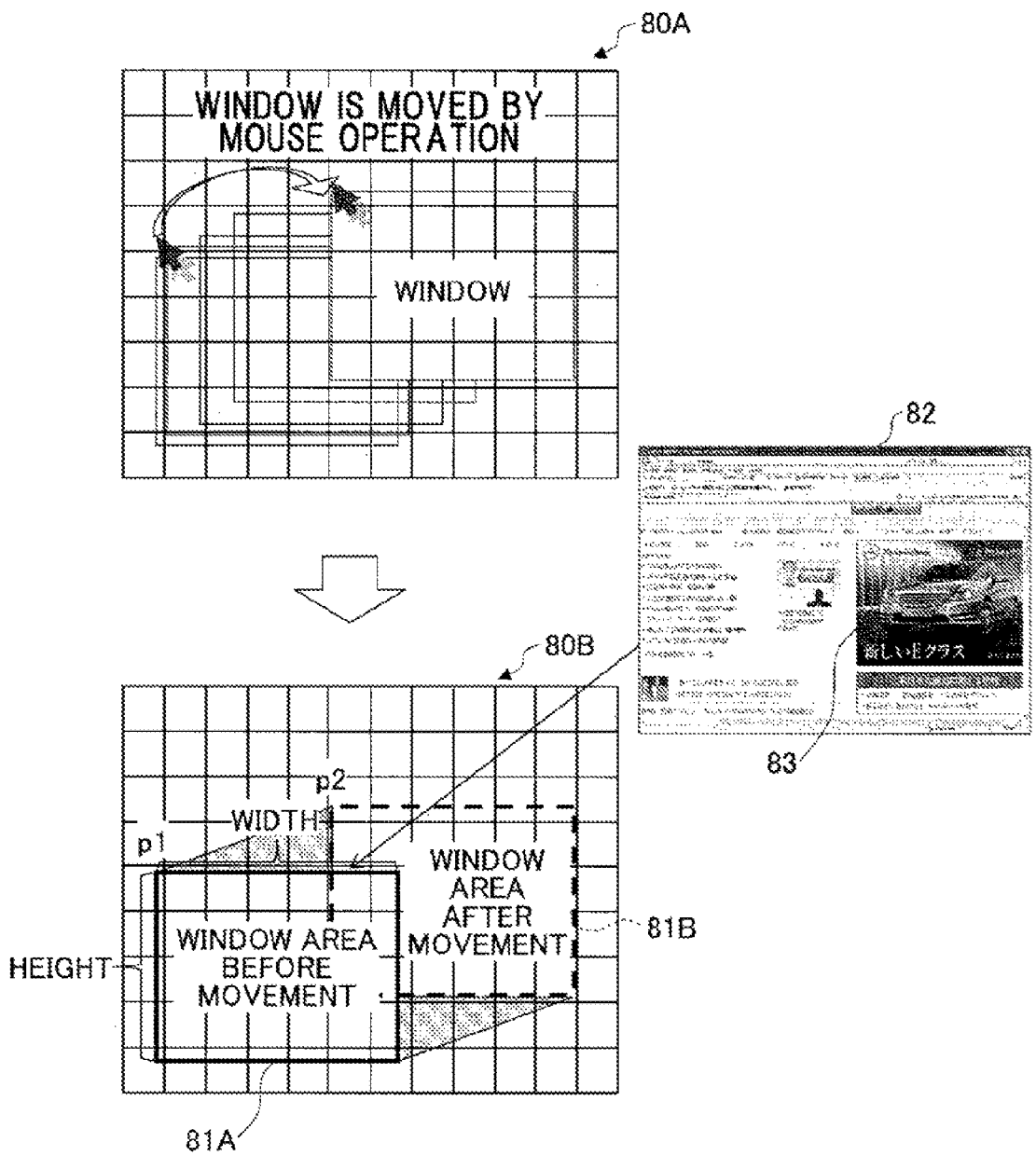
FIG. 7 is a drawing used to describe a problem related to a moved area.

FIG. 7 is a drawing used to describe a problem related to a moved area. A display screen 80A of FIG. 7 illustrates a mouse operation performed at the client 20 to move a window. A display screen 80B of FIG. 7 illustrates detection of a moved area at the server 10. In the display screen 80B, the window is moved from a window area 81A to a window area 81B. Here, the window is used as an example of a moved area.

When there is no changed part (a part that is changed or to be changed) in the window, it is only needed to transmit, to the client 20, movement information including coordinates p1 of the upper-left corner of the window before movement and coordinates p2 of the upper-left corner of the window after movement, and size information including the height and width of the window. The client 20 can generate an image of the window at the destination position using image data in a frame buffer 24 based on the movement information and the size information. Thus, in this case, it is possible to reduce the amount of data to be transmitted to the client 20.

Meanwhile, when a moved area is a window 82 of FIG. 7 that includes an animation advertisement 83 that changes, simply copying data of the moved area is not appropriate.

Also in this case, if a video-coding area is determined in the display screen, the video-coding area may include the window area 81A before movement and the window area 81B after movement and therefore cannot be displayed based on the movement information to reduce the amount of data to be transmitted to the client 20.

For the above reason, in the present embodiment, a video-coding area determining process is stopped when a moved area is detected, changes in the moved area are determined, and data including still images and/or videos are transmitted to the client 20 based on the change frequencies of areas in the moved area. This approach makes it possible to more effectively reduce the amount of data to be transmitted to the client 20. For this purpose, the server 10 includes functional units as described below.

The moved area detecting unit 109 detects a moved area in an image. For example, the moved area detecting unit 109 monitors draw commands executed by the OS execution control unit 11a and detects a copy command (e.g., CopyRect command).

When a copy command is detected, the moved area detecting unit 109 detects a moved area whose data is to be copied and moved. Here, it is assumed that the moved area detecting unit 109 obtains movement information including the coordinates of the upper-left vertex of the moved area before and after the movement (i.e., p1: coordinates before movement, and p2: coordinates after movement), and size information (h: height, w: width) of the moved area. The moved area detecting unit 109 outputs the obtained movement information and size information to the change determining unit 110 and the third transmission unit 111.

Alternatively, the moved area detecting unit 109 may be configured to detect edges by performing image processing on frames stored in the frame buffer 13 and to detect a moved area based on the movement of the detected edges.

When a moved area is detected by the moved area detecting unit 109, the server-side remote screen control unit 14 stops the video-coding area determining process for the entire screen.

The change determining unit 110 determines whether there is a changed partial area in a detected moved area which is different before and after the movement of the moved area. For example, the change determining unit 110 obtains a display screen image of the previous frame displayed by the client 20 and a display screen image written into the frame buffer 13 for the current frame.

Based on the movement information and size information of a moved area, the change determining unit 110 compares the moved area before movement (i.e., in the previous frame) and the moved area after movement (i.e., in the current frame). When parts of the moved area have been changed from the previous frame, the change determining unit 110 generates a partial area image by combining pixels of the parts of the moved area and shaping the combined pixels into a rectangle.

Meanwhile, when there is no changed part in the moved area, the change determining unit 110 requests the first transmission unit 107 to transmit, to the client 20, differential data between a screen F' generated immediately before the moved area is moved and a screen Fi–1 previously transmitted to the client 20. Also in this case, the change determining unit 110 requests the third transmission unit 111 to transmit the movement information (p1, p2) and the size information (w: width, h: height) to the client 20.

The change frequency determining unit 103 determines the change frequency of each of areas obtained by dividing a moved area. For example, the change frequency determining unit 103 accumulates partial area images generated by the change determining unit 110 in an internal working memory (not shown) for a predetermined period of time. The subsequent process is similar to the above described video-coding area determining process for the entire screen.

For example, when the predetermined period of time passes after starting accumulation of partial area images, the change frequency determining unit 103 determines the change frequency of the moved area to be displayed at the client 20 using a map obtained by dividing the moved area into a mesh.

In this case, the change frequency determining unit 103 accumulates attribute information for identifying the positions and sizes of partial area images. The attribute information of a partial area image may include the coordinates of the upper left vertex and the width and height of the partial area image. The coordinates of the upper left vertex may be represented by relative coordinates in the moved area.

The frequently-changed area identifying unit 104 identifies a frequently-changed partial area in a moved area as a frequently-changed area. The process of identifying a frequently-changed area in a moved area is substantially the same as the above described process of identifying a frequently-changed area in the entire screen.

For example, when mesh cells whose change counts are greater than a threshold are identified by the change frequency determining unit 103, the frequently-changed area identifying unit 104 combines adjacent mesh cells into a mesh cell aggregate and corrects the mesh cell aggregate into a rectangular shape. For example, the frequently-changed area identifying unit 104 obtains a supplemental area for supplementing the mesh cell aggregate and adds the supplemental area to the mesh cell aggregate to correct the mesh cell aggregate into a rectangular shape. The supplemental area may be obtained by using an algorithm that can generate a minimum area that is sufficient to shape a mesh cell aggregate into a rectangle.

The frequently-changed area identifying unit 104 outputs information including the relative coordinates of a vertex (e.g., the upper-left vertex) and the width and height of the identified frequently-changed area to the second transmission unit 108.

Figure 8:
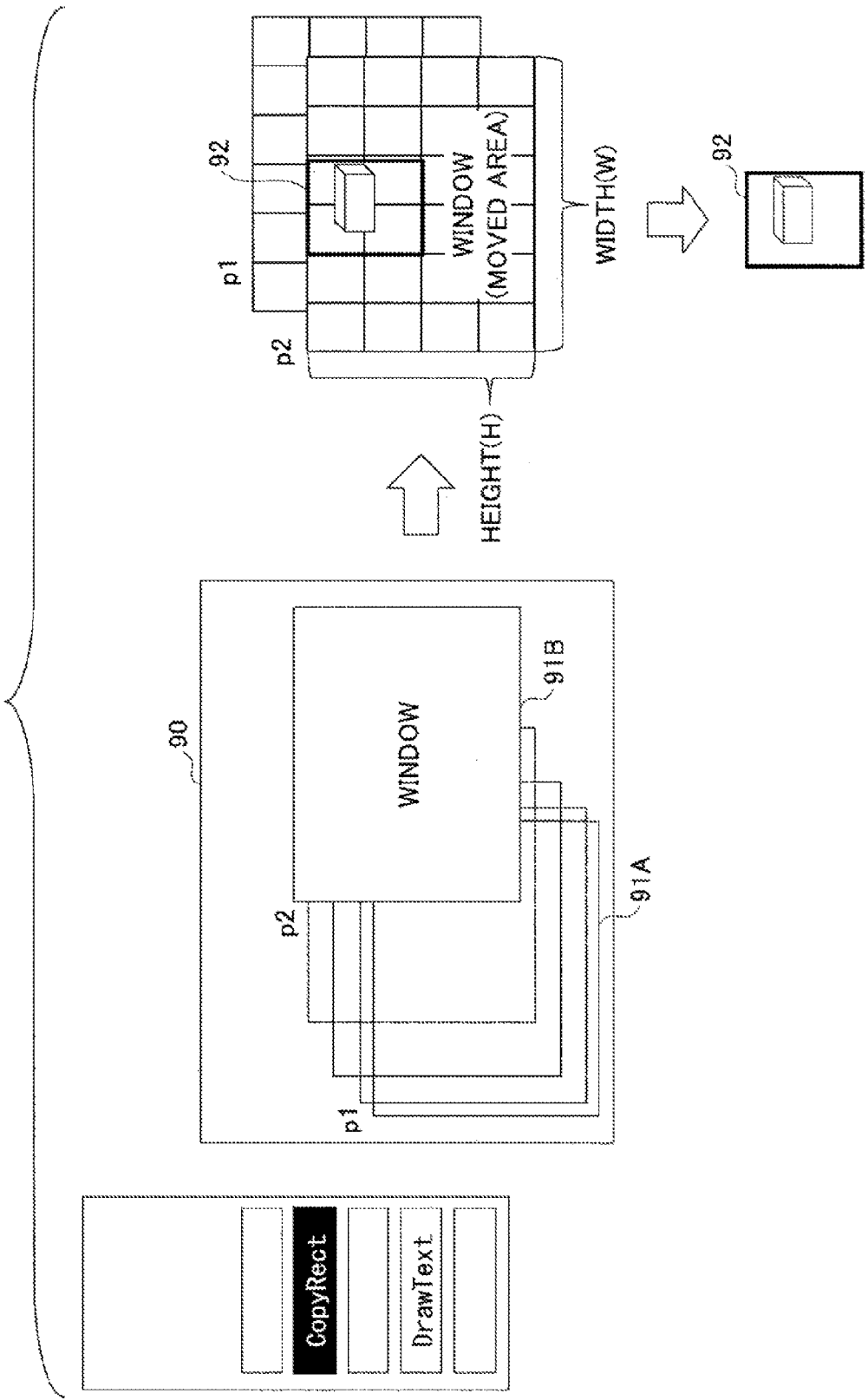
FIG. 8 is a drawing used to describe an exemplary method of extracting a partial area from a moved area.

FIG. 8 is a drawing used to describe an exemplary method of extracting a partial area from a moved area. In FIG. 8, it is assumed that a window in a display screen 90 is moved from a position indicated by a reference number 91A to a position indicated by a reference number 91B. The moved area detecting unit 109 detects the moved window and obtains (or detects) movement information (p1, p2) and size information (w, h) of the window.

Next, the change determining unit 110 determines whether there is a changed area in the window. In the example of FIG. 8, the change determining unit 110 determines that there are changes in a partial area 92. The change frequency determining unit 103 counts the number of times that the partial area 92 is changed (the count is referred to as a "change count"). The frequently-changed area identifying unit 104 identifies a frequently-changed area whose change count within a predetermined period of time is greater than a threshold.

The frequently-changed area identifying unit 104 outputs the relative coordinates and size information of the frequently-changed area to the second transmission unit 108 and the second encoder 106. The frequently-changed area identifying unit 104 also outputs attribute information including the relative coordinates and size information of areas other than the frequently-changed area to the first transmission unit 107 and the first encoder 105.

The above configuration makes it possible to reduce the amount of data transmitted to a client for a moved area detected in a display screen by transmitting movement information of the moved area, and also makes it possible to process even a moved area including a changed partial area. This in turn allows the user to comfortably operate a client.

Here, there may be a case where the change determining unit 110 detects two or more changed partial areas in a moved area, and the frequently-changed area identifying unit 104 identifies two or more frequently-changed areas in the moved area. In such a case, encoding all the frequently-changed areas according to a video-compression format may not result in reducing the amount of data but may instead increase the amount of data.

For this reason, when the number of identified frequently-changed areas is greater than or equal to a predetermined value, the frequently-changed area identifying unit 104 identifies an area encompassing instances of the moved area at positions before and after movement as a frequently-changed area. For example, the predetermined value may be set at "3".

FIG. 9 is a drawing used to describe an exceptional process of a video-coding area determining process for a moved area. In the example of FIG. 9, it is assumed that all partial areas 96A through 96C in a window 95 are identified as frequently-changed areas.

When there are multiple, relatively-small frequently-changed areas in a moved area (i.e., the window 95) as exemplified in FIG. 9, the amount of data may be more effectively reduced by encoding an area 98, which encompasses instances of the window 95 at positions before and after movement, in a display screen 97, rather than by encoding the respective frequently-changed areas according to a video compression format. In this case, the server-side remote screen control unit 14 resumes the video-coding area determining process for the entire screen.

The above method makes it possible to prevent the increase in the amount of data transmitted to the client 20 even when there are relatively-small frequently-changed areas in a moved area.

As described above, when an area of a display screen is identified as a frequently-changed area, a video-encoding process for encoding the frequently-changed area according to a video compression format is started. In this case, a portion of a bitmap image drawn in the frame buffer 13 corresponding to the frequently-changed area is input to the second encoder 106.

Meanwhile, rectangular update images for areas other than the frequently-changed area are compressed according to a still-image compression format even after the video-encoding process is started. That is, portions of the bitmap image drawn in the frame buffer 13 corresponding to the rectangular update images not included in the frequently-changed area are input to the first encoder 105.

Also, when a moved area is detected in a display screen, movement information and size information of the moved area is input to the third transmission unit 111. When a frequently-changed area is detected in the moved area, a video-coding process is started for the frequently-changed area. In this case, a portion of the bitmap image drawn in the frame buffer 13 corresponding to the frequently-changed area is input to the second encoder 106.

Meanwhile, for partial areas that are changed but not identified as frequently-changed areas, images of the partial areas before and after change are input to the first encoder 105.

Referring again to FIG. 1, the first encoder 105 encodes rectangular update images input from the frequently-changed area identifying unit 104 according to a still-image compression format. For example, the first encoder 105 encodes a rectangular update image according to a JPEG format to generate encoded still-image data (encoded data of the rectangular update image). Although a JPEG format is used here as an example of a still-image compression format, any other compression format such as Graphic Interchange Format (GIF) or Portable Network Graphics (PNG) may also be used for this purpose.

The first encoder 105 also encodes images of partial areas (partial area images) in a moved area, which are input from the frequently-changed area identifying unit 104, according to a still-image compression format.

The first transmission unit 107 transmits the encoded data of the rectangular update images and/or the partial area images output from the first encoder 105 to the client 20. For example, when transmitting the encoded data of the rectangular update images and/or the partial area images to the client 20, the first transmission unit 107 adds header information including a frame ID and a time stamp indicating transmission time to the encoded data.

The first transmission unit 112 may add header information to all sets of encoded data of the rectangular update images and/or the partial area images output from the first encoder 105. Alternatively, the first transmission unit 107 may add header information to at least one of the sets of encoded data of the rectangular update images and/or the partial area images. The header information may also include attribute information indicating the positions and sizes of the rectangular update images and/or the partial area images as well as attribute information of a frequently-changed area. For example, TCP/IP (Transmission Control Protocol/Internet Protocol) may be used as a communication protocol for transmitting rectangular update images and partial area images. Alternatively, UDP (User Datagram Protocol) may be used for this purpose.

The second encoder 106 encodes images of frequently-changed areas input from the frequently-changed area identifying unit 104 according to a video compression format. For example, the second encoder 106 encodes images of frequently-changed areas according to an MPEG format to generate encoded video data. Although an MPEG format is used here as an example of a video compression format, any other compression format such as Motion-JPEG may be used for this purpose. The frequently-changed areas may include a frequently-changed area in a moved area.

The second transmission unit 108 transmits encoded video data output from the second encoder 106 to the client 20. For example, the second transmission unit 108 adds header information to at least one of plural sets of encoded video data output from the second encoder 106. The header information may include attribute information of the frequently-changed areas. For example, RTP (Real-time Transport Protocol) may be used as a communication protocol for transmitting encoded video data of frequently-changed areas.

The third transmission unit 111 transmits movement information and size information output from the moved area detecting unit 109 to the client 20. For example, the third transmission unit 111 attaches header information and a flag indicating whether there is a moved area to the movement information and the size information to be transmitted to the client 20.

Figure 10:
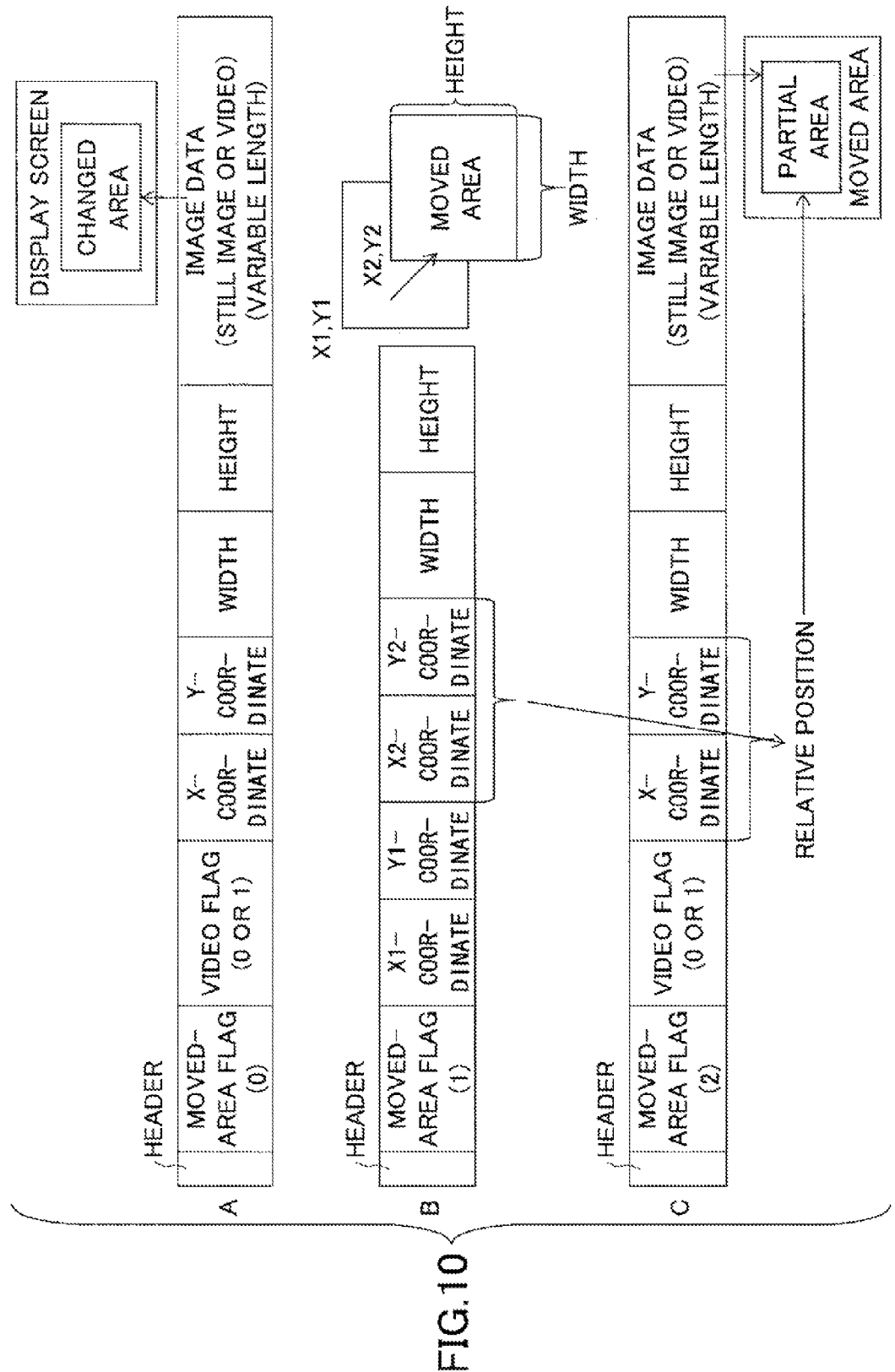
FIG. 10 is a drawing illustrating an exemplary structure of data to be transmitted to a client.

FIG. 10 is a drawing illustrating an exemplary structure of data to be transmitted to the client 20. Hereafter, data to be transmitted to the client 20 may be referred to as "transmission data". In the example of FIG. 10, transmission data includes some or all of a header, a moved-area flag, a video flag, coordinates, sizes, and image data.

The header may include, for example, attribute information of a frequently-changed area or a rectangular update image. The moved-area flag may be "0" indicating that there is no moved area or "1" or "2" indicating that there is a moved area. The video flag may be "0" indicating that image data is a still image or "1" indicating that image data is a video.

Data A in FIG. 10 is an example of transmission data when no moved area is detected. Data A is transmitted from the first transmission unit 107 or the second transmission unit 108 when no moved area is detected.

For example, when image data is a still image, the first transmission unit 107 sets the moved-area flag at "0", sets the video flag at "0", sets the coordinates of a vertex and sizes of the still image, and sets encoded data of the still image as the image data in transmission data to be transmitted to the client 20. Meanwhile, when image data is a video, the second transmission unit 108 sets the moved-area flag at "0", sets the video flag at "1", sets the coordinates of a vertex and sizes of the video, and sets encoded data of the video as the image data in transmission data to be transmitted to the client 20.

Data B in FIG. 10 is an example of transmission data to be transmitted from the third transmission unit 111. Data B includes the moved-area flag "1", movement information of a moved area (coordinates X1 and Y1 of a vertex of the moved area before movement and coordinates X2 and Y2 of the vertex of the moved area after movement), and size information (width, height) of the moved area.

Data C in FIG. 10 is an example of transmission data when a moved area is detected. Data C is transmitted from the first transmission unit 107 or the second transmission unit 108 when a moved area is detected.

For example, when image data is a still image, the first transmission unit 107 sets the moved-area flag at "2", sets the video flag at "0", sets the coordinates of a vertex and sizes of the still image, and sets encoded data of the still image as the image data in transmission data to be transmitted to the client 20. Meanwhile, when image data is a video, the second transmission unit 108 sets the moved-area flag at "2", sets the video flag at "1", sets the coordinates of a vertex and sizes of the video, and sets encoded data of the video as the image data in transmission data to be transmitted to the client 20.

The position of a changed partial area (which is changed or updated) in a moved area may be represented by relative coordinates that take, for example, the upper-left vertex of the moved area as the origin. The client 20 converts the relative coordinates indicating the position of the partial area into absolute coordinates by adding the relative coordinates to the absolute coordinates of, for example, the upper-left vertex of the moved area.

For this reason, to maintain data consistency, the transmission data from the third transmission unit 111 is transmitted prior to the transmission of data from the first transmission unit 107 and the second transmission unit 108.

The OS execution control unit 11a, the application execution control unit 11b, the graphic driver 12, and the server-side remote screen control unit 14 may be implemented by integrated circuits and electronic circuits. Also, some of the functional units of the server-side remote screen control unit 14 may be implemented as a separate integrated circuit or electronic circuit. Examples of integrated circuits include an application specific integrated circuit (ASIC) and a field programmable gate array (FPGA). Examples of electronic circuits include a central processing unit (CPU) and a micro processing unit (MPU).

<Configuration of Client>

Next, an exemplary configuration of the client 20 of the present embodiment is described. As illustrated in FIG. 1, the client 20 may include an input unit 21, a display unit 22, a client-side remote screen control unit 23, and a frame buffer 24. The client 20 may also include other functional units such as a sound output unit that a known computer normally includes.

The input unit 21 is an input device that receives various types of information such as instructions for the client-side remote screen control unit 23. For example, the input unit 21 may be implemented by a keyboard and a mouse. The mouse functions as a pointing device on the display unit 22.

The display unit 22 displays various types of information such as display screens transmitted from the server 10. For example, the display unit 22 may be implemented by a monitor, a display, or a touch panel.

The frame buffer 24 is a storage device that stores bitmap data displayed by the display unit 22. The frame buffer 24 may be implemented, for example, by a semiconductor memory device such as a random access memory (RAM) (e.g., a video random access memory (VRAM)), a read-only memory (ROM), or a flash memory. Also, the frame buffer 24 may be implemented by a storage medium such as a hard disk or an optical disk.

The client-side remote screen control unit 23 receives the remote screen control service provided by the server 10 via the client-side remote screen control application. As illustrated in FIG. 1, the client-side remote screen control unit 23 may include an operation information reporting unit 201, a first reception unit 202, a first decoder 203, a first display control unit 204, a second reception unit 205, a second decoder 206, a second display control unit 207, a third reception unit 208, and a third display control unit 209.

The operation information reporting unit 201 reports operation information input via the input unit to the server 10. For example, the operation information reporting unit 201 reports operation information indicating a right click, a left click, a double click, or dragging of the mouse, or the amount of movement of a mouse cursor obtained based on a moving operation of the mouse. As another example, the operation information reporting unit 201 may report operation information indicating the amount of rotation of a mouse wheel or the type of a key pressed on the keyboard.

The first reception unit 202 receives encoded data and attribute information of a rectangular update image or a partial area image of a moved area transmitted from the first transmission unit 107 of the server 10. For example, the first reception unit 202 outputs the received encoded data to the first decoder 203.

The first decoder 203 decodes the encoded data of the rectangular update image or the partial area image of the moved area received by the first reception unit 202. The first decoder 203 employs a decoding algorithm corresponding to an encoding algorithm used by the server 10.

The first display control unit 204 causes the display unit 22 to display the rectangular update image or the partial area image obtained by decoding the encoded data by the first decoder 203. For example, the first display control unit 204 displays the rectangular update image (bitmap image) in a screen area of the display unit 22 which corresponds to the position and size of the rectangular update image indicated by the attribute information received by the first reception unit 202.

Also, the first display control unit 204 performs a process as described below when attribute information of a frequently-changed area is received by the first reception unit 202. The first display control unit 204 sets a screen area of the display unit 22 which corresponds to the position and size of the frequently-changed area indicated by the attribute information as a blank area where no bitmap image is to be displayed.

Further, when data has been received by the third reception unit 208, the first display control unit 204 determines that data received by the first reception unit 202 represents a partial area image of a moved area. In this case, the first display control unit 204 converts the relative coordinates of the partial area image (still image) into absolute coordinates by adding the relative coordinates to the coordinates of the moved area after movement which are received by the third reception unit 208, and displays the partial area image at the absolute coordinates.

The second reception unit 205 receives an encoded image and attribute information of a frequently-changed area transmitted from the second transmission unit 108 of the server 10.

The second decoder 206 decodes the encoded image of the frequently-changed area received by the second reception unit 205. The second decoder 206 employs a decoding algorithm corresponding to an encoding algorithm used by the server 10.

The second display control unit 207 causes the display unit 22 to display the decoded image (video) of the frequently-changed area output from the second decoder 206 based on the attribute information received by the second reception unit 205. For example, the second display control unit 207 displays the decoded image of the frequently-changed area in a screen area of the display unit 22 which corresponds to the position and size of the frequently-changed area indicated by the attribute information. The frequently-changed area may indicate a frequently-changed area in the entire display screen or in a moved area.

Also, when data has been received by the third reception unit 208, the second display control unit 207 determines that data received by the second reception unit 205 represents a partial area image (video) of a moved area. In this case, the second display control unit 207 converts the relative coordinates of the partial area image (video) into absolute coordinates by adding the relative coordinates to the coordinates of the moved area after movement which are received by the third reception unit 208, and displays the partial area image at the absolute coordinates.

The third reception unit 208 receives data related to a moved area from the third transmission unit 111 of the server 10. The third reception unit 208 outputs the received data to the third display control unit 209.

The third display control unit 209 obtains image data corresponding to a moved area from the frame buffer 24 based on movement information and size information included in the data received by the third reception unit 208, and causes the display unit 22 to display the obtained image data at a destination position indicated by the movement information.

Next, order of data received at the client 20 is described. In the descriptions below, data received at the client 20 may be referred to as "received data". FIG. 11 is a drawing illustrating order of received data. In FIG. 11, "A", "B", and "C" indicate data A, B, and C illustrated in FIG. 10.

(1) When no moved area is detected but a changed area is detected

When no moved area is detected but a changed area is detected at the server 10, the client 20 receives sets of data A in sequence.

(2) When a moved area is detected and no changed area is detected in the moved area When a moved area is detected and no changed area is detected in the moved area at the server 10, the client 20 receives data B transmitted from the third transmission unit 111 and then receives data A transmitted from the first transmission unit 107. In this case, data A represents an image of an area that appears on the screen as a result of moving the moved area.

(3) When a moved area is detected and a changed area is detected in the moved area When a moved area is detected and a changed area (partial area) is detected in the moved area at the server 10, the client 20, similarly to case (2) above, receives data B transmitted from the third transmission unit 111 and next receives data A transmitted from the first transmission unit 107. Then, the client 20 receives data C including image data of the partial area of the moved area transmitted from the first transmission unit 107 or the second transmission unit 108.

In data C, the position of the partial area is indicated by relative coordinates. The client 20 converts the relative coordinates into absolute coordinates by adding the relative coordinates to the coordinates of the moved area in data B.

With the above configuration or method, the client 20 can receive sets of data in such an order that data consistency can be maintained.

The client-side remote screen control unit 23 may be implemented by an integrated circuit or an electronic circuit. Also, some of the functional units of the client-side remote screen control unit 23 may be implemented as a separate integrated circuit or electronic circuit. Examples of integrated circuits include an ASIC and an FPGA. Examples of electronic circuits include a CPU and an MPU.

<Operations>

Exemplary operations of the server 10 and the client 20 of the thin client system 1 are described below. First, operations of the server 10 are described.

<Process Performed by Server>

Figure 12B:
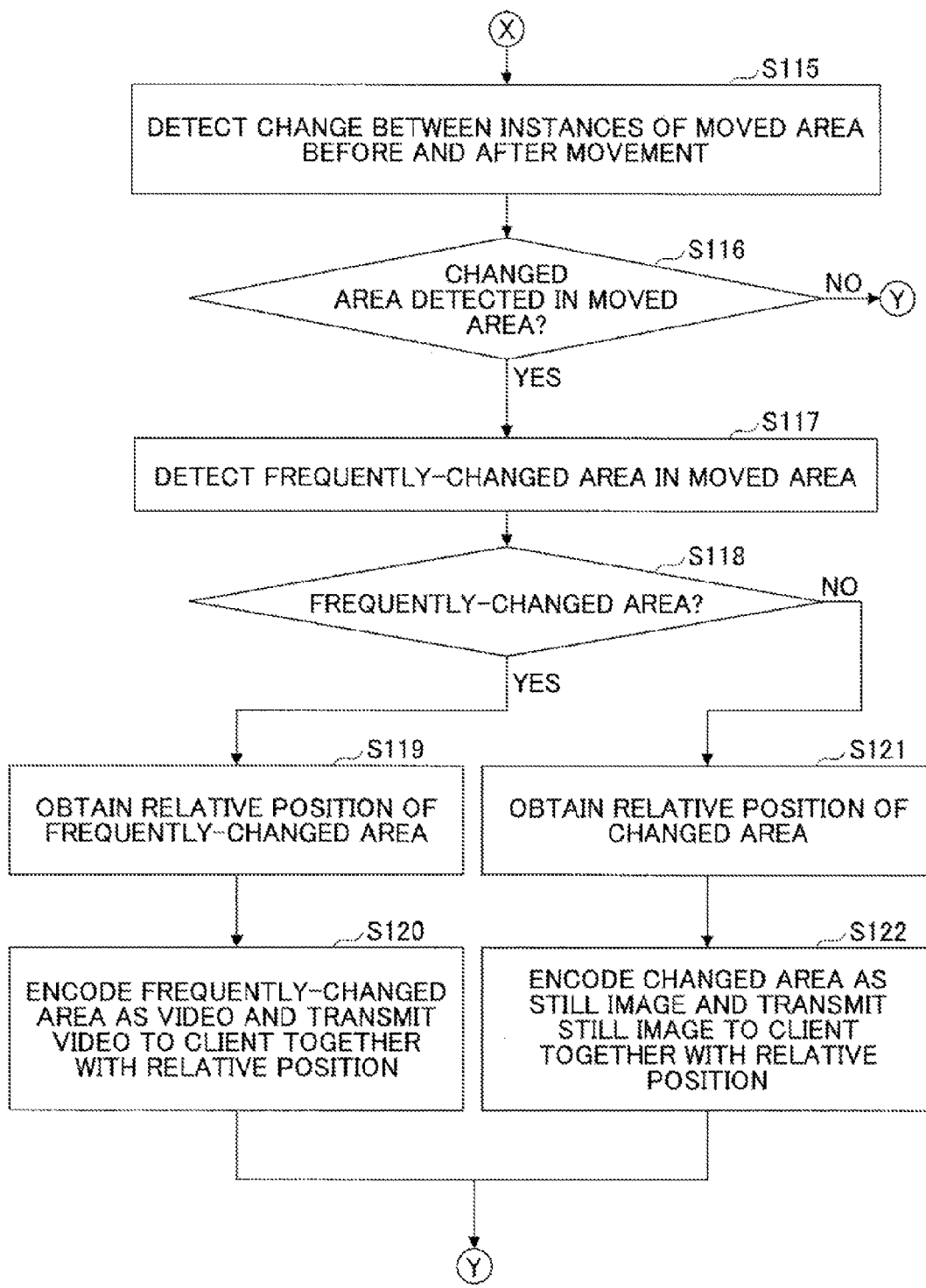
FIG. 12B is a flowchart illustrating an exemplary process performed by a server.

FIGS. 12A and 12B are flowcharts illustrating an exemplary process performed by the server 10. In the exemplary process of FIGS. 12A and 12B, it is assumed that a moved area is detected based on draw commands.

In step S101, the moved area detecting unit 109 monitors draw commands to detect movement of an area in a display screen. For example, the moved area detecting unit 109 determines that an area is moved or copied (i.e., detects a moved area) when a CopyRect command is detected.

In step S102, the moved area detecting unit 109 determines whether a moved area has been detected. When a moved area has been detected (YES in step S102), the process proceeds to step S108. Meanwhile, when no moved area has been detected (NO in step S102), the process proceeds to step S103.

In step S103, the change frequency determining unit 103 determines whether there is a changed area in the display screen. In this step, the change frequency determining unit 103 determines a changed area in the entire display screen. When there is a changed area (YES in step S103), the process proceeds to step S104. Meanwhile, when there is no changed area (NO in step S103), the process proceeds to step S107.

In step S104, the frequently-changed area identifying unit 104 determines whether the changed area is a frequently-changed area. When the changed area is a frequently-changed area (YES in step S104), the process proceeds to step S105.

Meanwhile, when the changed area is not a frequently-changed area (NO in step S104), the process proceeds to step S106.

In step S105, the second encoder 106 encodes the frequently-changed area according to a video compression format to generate video data. In this case, the second transmission unit 108 transmits the video data to the client 20.

In step S106, the first encoder 107 encodes the changed area according to a still-image compression format to generate still-image data. In this case, the first transmission unit 107 transmits the still-image data to the client 20.

In step S107, the server-side remote screen control unit 14 waits for a predetermined period of time and then returns to step S101.

In step S108, when there is a video-coding area (or frequently-changed area) detected immediately before the moved area is detected, the server-side remote screen control unit 14 stops (or cancels) the video-coding process for the video-coding area.

In step S109, the image generation unit 102 compares data of the display screen generated immediately before the moved area is detected with data of the display screen previously transmitted to the client 20.

In step S110, the image generation unit 102 determines whether there is a difference between the two sets of data. When there is a difference between them (YES in step S110), the process proceeds to step S111. Meanwhile, when there is no difference between them (NO in step S110), the process proceeds to step S112.

In step S111, the first transmission unit 112 transmits data representing the difference to the client 20. In other words, data that represents a change made immediately before the detection of the moved area and that has not been transmitted to the client 20 is transmitted to the client 20. As a result, the display screen being displayed at the client 20 is updated to a state immediately before the moved area is detected.

In step S112, the third transmission unit 111 transmits movement information and size information of the moved area to the client 20.

In step S113, the change frequency determining unit 103 determines whether there is a changed area in the display screen. In this step, the change frequency determining unit 103 determines a changed area in the entire display screen. When there is a changed area (YES in step S113), the process proceeds to step S114. Meanwhile, when there is no changed area (NO in step S113), the process proceeds to step S107.

In step S114, the first encoder 114 encodes the changed area according to a still-image compression format to generate still-image data. In this case, the first transmission unit 107 transmits the still-image data to the client 20. Image data of an area that appears on the screen as a result of moving the moved area is also transmitted to the client 20 in this step.

In step S115, the change determining unit 110 detects a change between instances of the moved area before and after movement based on relative coordinates within the moved area.

In step S116, the change determining unit 110 determines whether a changed area has been detected in the moved area. When a changed area has been detected in the moved area (YES in step S116), the process proceeds to step S117. Meanwhile, when no changed area has been detected in the moved area (NO in step S116), the process proceeds to step S107.

In step S117, the frequently-changed area identifying unit 104 detects a frequently-changed area in the moved area.

In step S118, the frequently-changed area identifying unit 104 determines whether the changed area is a frequently-changed area. When the changed area is a frequently-changed area (YES in step S118), the process proceeds to step S119. Meanwhile, when the changed area is not a frequently-changed area (NO in step S118), the process proceeds to step S121.

In step S119, the frequently-changed area identifying unit 104 obtains the relative position (relative coordinates) of the frequently-changed area with respect to the origin (e.g., the upper-left vertex) of the moved area.

In step S120, the second encoder 120 encodes the frequently-changed area in the moved area according to a video compression format to generate video data. In this case, the second transmission unit 108 transmits the video data to the client 20.

In step S121, the frequently-changed area identifying unit 104 obtains the relative position of the changed area with respect to the origin of the moved area.

In step S122, the first encoder 107 encodes the changed area in the moved area according to a still-image compression format to generate still-image data. In this case, the first transmission unit 107 transmits the still-image data to the client 20. Following step S120 or S122, the process proceeds to step S107.

When plural frequently-changed areas are detected in step S117/S118 and the number of the frequently-changed areas is greater than a predetermined value, the server 10 may be configured to proceed to step S103 as an exceptional process. This exceptional process makes it possible to prevent encoding relatively-small frequently-changed areas in a moved area and thereby prevent an increase in the amount of data transmitted to the client 20.

<Process Performed by Client>

FIG. 13 is a flowchart illustrating an exemplary process performed by the client 20. In step S201 of FIG. 13, the client 20 receives data from the server 10.

In step S202, the client-side remote screen control unit 23 determines whether the third reception unit 208 has received data including movement information. When the third reception unit 208 has received data (YES in step S202), the process proceeds to step S207. Meanwhile, when the third reception unit 208 has not received data (NO in step S202), the process proceeds to step S203.

In step S203, the client-side remote screen control unit 23 determines whether data including changed image data (data of a changed area, i.e., data A of FIG. 10) has been received.

In step S204, the client-side remote screen control unit 23 determines whether the changed image data is video data based on, for example, the video flag. When the changed image data is video data (YES in step S204), the process proceeds to step S205. Meanwhile, when the changed image data is not video data, i.e., still image data (NO in step S204), the process proceeds to step S206.

In step S205, the second decoder 206 decodes the video data, and the second display control unit 207 draws the decoded video data at a position indicated by attribute information and thereby displays the decoded video data on the display unit 22.

In step S206, the first decoder 203 decodes the still image data, and the first display control unit 204 draws the decoded still image data at a position indicated by attribute information and thereby displays the decoded still image data on the display unit 22.

In step S207, the third display control unit 209 obtains data of a moved area from the frame buffer based on the movement information and the size information of the moved area, draws the obtained data at a destination position indicated by the movement information, thereby displays the obtained data on the display unit 22.

In step S208, the client-side remote screen control unit 23 determines whether there is changed image data in the moved area. This can be determined, for example, based on whether data C is received after data B. When there is changed image data in the moved area (YES in step S208), the process proceeds to step S209. Meanwhile, when there is no changed image data in the moved area (NO in step S208), the process proceeds to step S203.

In step S209, the client-side remote screen control unit 23 converts the relative position of the changed image data (changed partial area) in the moved area into an absolute position in the display screen. For example, the client-side remote screen control unit converts the relative position into the absolute position in the display screen by adding the relative coordinates of a vertex of the changed partial area to the coordinates of a vertex of the moved area.

In step S210, the client-side remote screen control unit 23 determines whether the changed image data is video data based on, for example, the video flag. When the changed image data is video data (YES in step S210), the process proceeds to step S211. Meanwhile, when the changed image data is not video data, i.e., still image data (NO in step S210), the process proceeds to step S212.

In step S211, the second decoder 206 decodes the video data in the moved area, and the second display control unit 207 draws the decoded video data at the absolute position obtained in step S209 and thereby displays the decoded video data on the display unit 22.

In step S212, the first decoder 203 decodes the still image data, and the first display control unit 204 draws the decoded still image data at the absolute position obtained in step S209 and thereby displays the decoded still image data on the display unit 22.

In step S213, the input unit 21 determines whether a user input has been received. When a user input has been received (YES in step S213), the process proceeds to step S214. Meanwhile, when no user input has been received (NO in step S213), the process returns to step S201.

In step S214, the operation information reporting unit 201 transmits data indicating the user input to the server 10. After step S214 is performed, the process returns to step S201.

Thus, the above embodiment makes it possible to encode a frequently-changed area according to a video compression format (i.e., convert images of the frequently-changed area into a video) and thereby reduce the amount of data to be transmitted to a client. The above embodiment also makes it possible to generate data of a changed area in a moved area (e.g., a window) in an appropriate format based on the change frequency of the changed area and thereby makes it possible to reduce the amount of data to be transmitted to a client.

EXAMPLE

Figure 14:
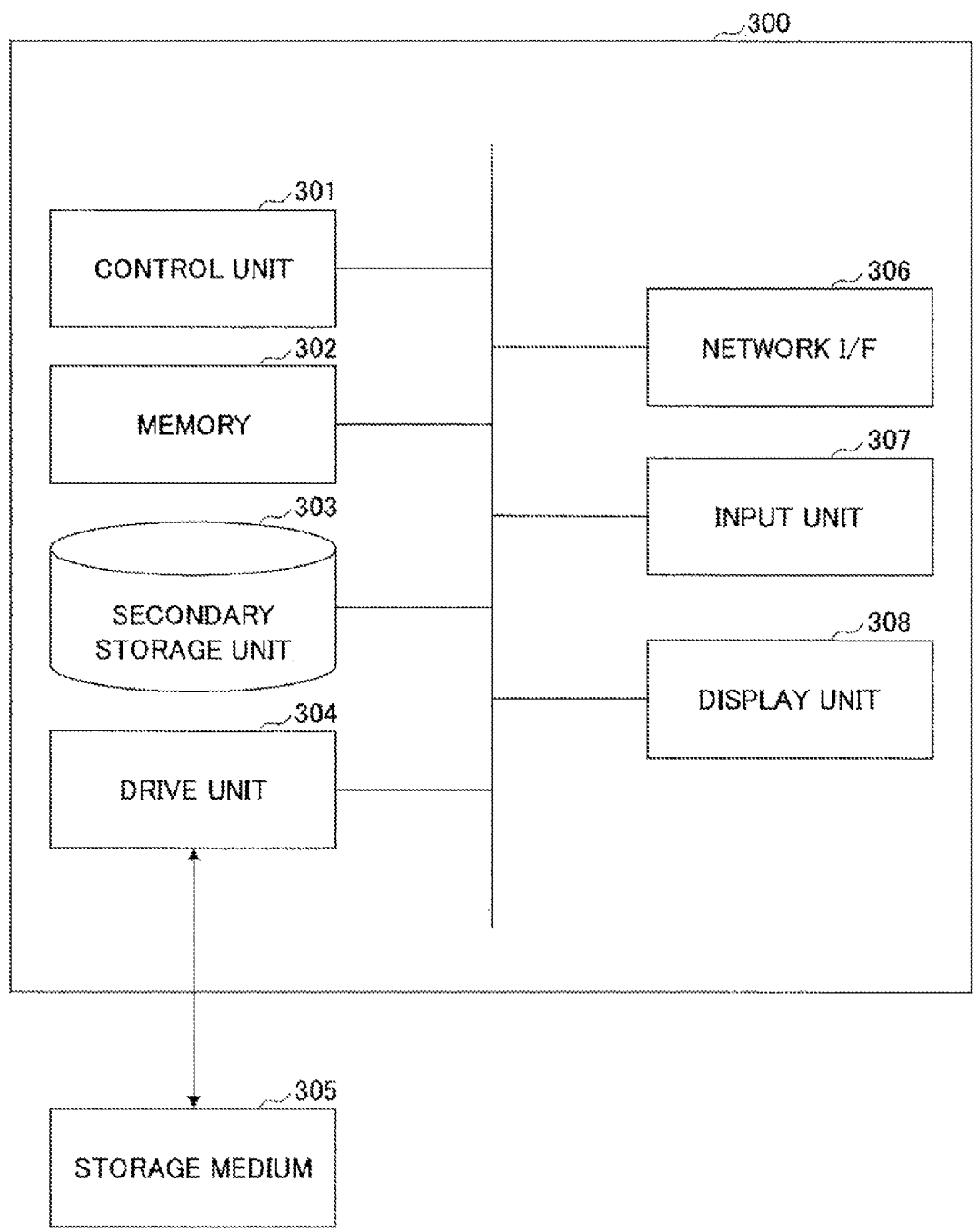
FIG. 14 is a block diagram illustrating an exemplary configuration of an information processing apparatus.

FIG. 14 is a block diagram illustrating an exemplary configuration of an information processing apparatus 300. The information processing apparatus 300 is an example of an apparatus that can be used to implement the server 10 and the client 20 described above. As illustrated in FIG. 14, the information processing apparatus 300 may include a control unit 301, a memory 302, a secondary storage unit 303, a drive unit 304, a network interface (I/F) 306, an input unit 307, and a display unit 308. These components are connected to each other via a bus to enable transmission and reception of data.

The control unit 301 is a central processing unit (CPU) that controls other components of the information processing apparatus 300 and performs calculations and data processing. The control unit 301 also executes programs stored, for example, in the memory 302 and the secondary storage unit 303. The programs perform the processes described above with reference to FIGS. 12A, 12B, and 13.

In other words, the control unit 301 can perform the processes and implement the functional units described in the above embodiment by executing the programs.

The memory 302 may be implemented, for example, by a read-only memory (ROM) or a random access memory (RAM), and retains or temporarily stores data and programs such as basic software (operating system (OS)) and application software to be executed by the control unit 301.

The secondary storage unit 303 may be implemented by a hard disk drive (HDD), and stores, for example, data related to application software.

The drive unit 304 reads programs from a storage medium 305 and installs the programs in the memory 402 and/or the secondary storage unit 403.

The programs stored in the storage medium 305 are installed in the information processing apparatus 300 via the drive unit 304. The installed programs can be executed by the information processing apparatus 300.

The network I/F 306 is an interface that allows the information processing apparatus 300 to communicate with other devices including communication functions and connected via a network, such as a local area network (LAN) or a wide area network (WAN), implemented by wired and/or wireless data communication channels.

The input unit 307 may include a keyboard including cursor keys, numeric keys, and function keys, and a mouse or a trackpad for selecting an item on a screen displayed on the display unit 308. Thus, the input unit 307 is a user interface that allows the user to input, for example, instructions and data to the control unit 301.

The display unit 308 may be implemented by, for example, a cathode ray tube (CRT) display or a liquid crystal display (LCD), and displays data received from the control unit 301.

The processes described in the above embodiment may be implemented as programs that are executable by a computer. Such programs may be downloaded from a server and installed in a computer.

Alternatively, the programs may be stored in the storage medium 305, and may be read from the storage medium 305 into a computer or a portable device. For example, storage media such as a compact disk read-only memory (CD-ROM), a flexible disk, and a magneto-optical disk that record information optically, electrically, or magnetically, and semiconductor memories such as a ROM and a flash memory that record information electrically may be used as the storage medium 305. The storage medium 305 does not indicate a carrier wave. Further, the processes described in the above embodiment may be implemented by one or more integrated circuits.

Here, there is an increasing need to use a thin client system for office work from a mobile environment. To meet the need, it is necessary to more efficiently process videos and to improve the performance of remote screen control applications. The above embodiment makes it possible to use a thin client system even in a mobile environment.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus connected via a network to a terminal, the information processing apparatus comprising:
a processor configured to execute a process including
generating an image to be displayed at the terminal;
detecting a moved area in the image;
determining whether the detected moved area includes one or more changed partial areas each of which is comprised of multiple blocks and is different before and after movement of the moved area;
identifying an area encompassing instances of the moved area at positions before and after the movement as a frequently-changed area when it is determined that the moved area includes plural changed partial areas that are apart from each other and a number of the changed partial areas identified as frequently-changed areas is greater than a predetermined value;
transmitting video data of the area encompassing the instances of the moved area at positions before and after the movement and identified as the frequently-changed area to the terminal; and
transmitting movement information and size information of the moved area to the terminal.

2. The information processing apparatus as claimed in claim 1, wherein the movement information and the size information are transmitted to the terminal before the video data is transmitted.

3. A method performed by an information processing apparatus connected via a network to a terminal, the method comprising:
generating an image to be displayed at the terminal;
detecting a moved area in the image;
determining whether the detected moved area includes one or more changed partial areas each of which is comprised of multiple blocks and is different before and after movement of the moved area;
identifying an area encompassing instances of the moved area at positions before and after the movement as a frequently-changed area when it is determined that the moved area includes plural changed partial areas that are apart from each other and a number of the changed partial areas identified as frequently-changed areas is greater than a predetermined value;
transmitting movement information and size information of the moved area to the terminal; and
transmitting video data of the area encompassing the instances of the moved area at positions before and after the movement and identified as the frequently-changed area to the terminal.

4. A non-transitory computer-readable storage medium storing program code for causing an information processing apparatus connected via a network to a terminal to perform a method, the method comprising:
generating an image to be displayed at the terminal;
detecting a moved area in the image;
determining whether the detected moved area includes one or more changed partial areas each of which is comprised of multiple blocks and is different before and after movement of the moved area;
identifying an area encompassing instances of the moved area at positions before and after the movement as a frequently-changed area when it is determined that the moved area includes plural changed partial areas that are apart from each other and a number of the changed partial areas identified as frequently-changed areas is greater than a predetermined value;
transmitting movement information and size information of the moved area to the terminal; and
transmitting video data of the area encompassing the instances of the moved area at positions before and after the movement and identified as the frequently-changed area to the terminal.

* * * * *